(12) United States Patent
Tsai et al.

(10) Patent No.: US 7,280,544 B2
(45) Date of Patent: Oct. 9, 2007

(54) TRANSMISSION CONVERGENCE SUBLAYER CIRCUIT AND OPERATING METHOD FOR ASYNCHRONOUS RECEIVER

(75) Inventors: Tien-Ju Tsai, Changhua (TW); Chih-Feng Lin, Hsinchu (TW)

(73) Assignee: MACRONIX International Co., Ltd., Hsinchu (TW)

( * ) Notice: Subject to any disclaimer, the term of this patent is extended or adjusted under 35 U.S.C. 154(b) by 1214 days.

(21) Appl. No.: 10/064,384

(22) Filed: Jul. 9, 2002

(65) Prior Publication Data
US 2003/0048803 A1    Mar. 13, 2003

(30) Foreign Application Priority Data
Sep. 11, 2001    (TW) .............................. 90122431 A

(51) Int. Cl.
*H04L 12/54* (2006.01)
(52) U.S. Cl. ..................... 370/395.6; 370/463; 370/474
(58) Field of Classification Search ............. 370/395.6, 370/395.7, 395.71, 395.72
See application file for complete search history.

(56) References Cited

U.S. PATENT DOCUMENTS

| | | | | |
|---|---|---|---|---|
| 5,537,400 A | * | 7/1996 | Diaz et al. .................. | 370/412 |
| 5,570,368 A | * | 10/1996 | Murakami et al. .......... | 370/503 |
| 5,600,633 A | * | 2/1997 | Jaisingh et al. ............. | 370/277 |
| 5,966,447 A | * | 10/1999 | Nishida et al. ............... | 380/28 |
| 6,381,243 B1 | * | 4/2002 | Ekstedt .................. | 370/395.62 |
| 6,721,336 B1 | * | 4/2004 | Witel et al. ................. | 370/474 |
| 7,142,544 B2 | * | 11/2006 | Kim et al. ............... | 370/395.1 |
| 2004/0202174 A1 | * | 10/2004 | Kim et al. ............... | 370/395.1 |

* cited by examiner

*Primary Examiner*—Seema S. Rao
*Assistant Examiner*—Kevin Mew
(74) *Attorney, Agent, or Firm*—Jianq Chyun IP Office

(57) ABSTRACT

Transmission convergence sublayer circuit is coupled between a buffer and a deframer. The deframer submits a data stream enable signal and data bytes to the circuit. The data stream enable signal enables the circuit so that multiple groups of byte data belonging to a data cell are received and temporarily stored inside a byte-wise data pipeline. A header cyclic redundancy checker also receives the byte data and then conducts a header search. An idle cell identifier is used to determine if the data cell is a non-idle cell. When the header is found and determined to be a non-idle cell, a descrambler retrieves payload data of data cell from the byte-wise data pipeline and conducts a descrambling operation after obtaining a quantity of data equal to a double word. Ultimately, the double word data is output to the buffer with minimum delay.

25 Claims, 22 Drawing Sheets

| 8-bit syndrome code | 32-bit correction code |
|---|---|
| 0x07<br>0x0e<br>0x1c<br>0x38 | 0x00000001<br>0x00000002<br>0x00000004<br>0x00000008 |
| 0x70<br>0xe0<br>0xc7<br>0x89 | 0x00000010<br>0x00000020<br>0x00000040<br>0x00000080 |
| 0x15<br>0x2a<br>0x54<br>0xa8 | 0x00000100<br>0x00000200<br>0x00000400<br>0x00000800 |
| 0x57<br>0xae<br>0x5b<br>0xb6 | 0x00001000<br>0x00002000<br>0x00004000<br>0x00008000 |
| 0x6b<br>0xd6<br>0xab<br>0x51 | 0x00010000<br>0x00020000<br>0x00040000<br>0x00080000 |
| 0xa2<br>0x43<br>0x86<br>0x0b | 0x00100000<br>0x00200000<br>0x00400000<br>0x00800000 |
| 0x16<br>0x2c<br>0x58<br>0xb0 | 0x01000000<br>0x02000000<br>0x04000000<br>0x08000000 |
| 0x67<br>0xce<br>0x9b<br>0x31 | 0x10000000<br>0x20000000<br>0x40000000<br>0x80000000 |
| default | 0x00000000 |

FIG. 14

TRANSMISSION CONVERGENCE SUBLAYER CIRCUIT AND OPERATING METHOD FOR ASYNCHRONOUS RECEIVER

CROSS REFERENCE TO RELATED APPLICATIONS

This application claims the priority benefit of Taiwan application serial no. 90122431, filed Sep. 11, 2001.

BACKGROUND OF INVENTION

1. Field of Invention

The present invention relates to the circuit and operating method of an asynchronous transmission receiver. More particularly, the present invention relates to the transmission convergence sublayer circuit and operating method of an asynchronous transmission receiver.

2. Description of Related Art

In a communication system, data is transferred from an emission system to a reception system through a transmission medium. The transmitted data is assembled together according to specified communication protocols in several layers. Similarly, the reception system processes the received data layer by layer according to the communication protocols. Among the communication protocols, the lowest layer unit is the physical layer. In asynchronous transfer mode, the physical layer is further divided into two units, namely, a physical medium and a transmission convergence sublayer.

FIG. 1 shows the data format of cell data processed by the transmission convergence sublayer at the transmission terminal working in the asynchronous transfer mode. The data format is decided by international telecommunication union (ITU) according to broadband integrated service digital network (B-ISDN) proposal ITU-T I.432. The proposed specification stipulates that the data format of a cell using an asynchronous transfer mode must have a size capable of accommodating 53 bytes. The 53 bytes include 5 bytes of header and 48 bytes of the so-called payload. The 5 bytes of header further comprises 4 bits of general flow control (GFC) code, 8 bits of virtual transmission path identification (VPI) code, 16 bits of virtual transmission channel identification (VCI), 3 bits of package type (PT) code, 1 bit of loss package classification (CLP) code and 8 bits of header error control (HEC) code.

To ensure correctness of header cell data at the receiving terminal, the first 32 bits in the header cell is applied to a cyclic redundancy check (CRC) polynomial $X^8+X^2+X+1$ to produce an 8-bit header cyclic redundancy code. FIG. 2A is a block showing a conventional method of using a header cyclic redundancy code generator at the emission terminal to produce header cyclic redundancy code. The circuit in FIG. 2A is capable of generating necessary header cyclic redundancy code for data error detection.

The upper layer unit generates transmission data according to an asynchronous transfer communication protocol. The transmission data at the transfer terminal of the transmission convergence sublayer is scrambled to produce the payload within the data cell according to a scrambling polynomial $X^{43}+1$.

In general, the asynchronous transfer mode is structured upon a synchronized transmission system with a fixed bandwidth. When nothing is transmitted from an upper layer unit, the transmission convergence sublayer must generate an idle cell having special header and payload and the idle cell data must be transferred to a physical medium for transmission rate matching. The processing work required to be performed by the transmission convergence sublayer at the receiving terminal in an asynchronous transfer mode includes receiving a data stream and comparing the data stream with header cyclic redundancy code to find the header cell. Ultimately, data cells are correctly positioned and synchronously received. Once such synchronized state is reached, correctness of the header cell data in subsequently received data cells are checked and the payload within the data cell is descrambled. If the header cell is found to be correct and the data cell is not an idle cell, the header cyclic redundancy code in the header cell is removed. The data cell is rearranged to form a word and the word is written into a buffer. Finally, the word data is transferred to an upper layer for subsequent treatment.

FIG. 2B is a block diagram showing a conventional data cell synchronizing circuit for a receiver terminal operating in an asynchronous transfer mode. Reference is made to FIG. 2B for synchronizing reception of data cells in the transmission convergence sublayer by an asynchronous receiving terminal and the method of checking the correctness of header cells within the data cells received after synchrony.

In FIG. 2B, a modulo 2 adder 202, a D-type flip-flop 204 and a cyclic redundancy check arithmetic operation circuit 206 together form a long division circuit. The number to be divided is the first 40 bits of data in the data cell and the divisor is the polynomial $X^8+X^2+X+1$. If the result of calculation is correct, a decoder 208 decodes the computed value to obtain a cell synchronizing pulse. On the other hand, if the result of calculation is incorrect, 8 bits of data move in from the data cell to conduct a division. However, the earliest 8 bits of the previously divided 40 bit data must be corrected to eliminate any effect in the next round of division operation. The circuit comprising another modulo 2 adder 210, D-type flip-flop 214 and remainder arithmetic operation circuit 212 serve to eliminate the effect the 8 bit data has on the next round of division operation.

The function of the circuit in FIG. 2B is to operate on the received data stream. Through a comparison with the header cyclic redundancy code, the header cell is found. Hence, the data cells are received in synchrony. Furthermore, after data cell synchronization, header cyclic redundancy code comparison of subsequently received data cells continues.

However, to descramble the payload within a data cell, rearrange the data format from byte groups to word groups or double word groups and submit to buffer for processing by the upper layer unit, additional secondary circuit stages must be introduced. Hence, synchronized reception, header inspection, data descrambling and data format rearrangement must rely on the complicated integration of circuits such as the one shown in FIG. 2B and any additional secondary circuit stages. Consequently, data processing takes longer to complete.

SUMMARY OF INVENTION

Accordingly, one object of the present invention is to provide a transmission convergence sublayer circuit and operating method for receiving an asynchronous transmission. The circuit has an optimized structure capable of synchronizing data reception and conducting header inspection, data descrambling as well as data format rearrangement in the shortest possible time.

To achieve these and other advantages and in accordance with the purpose of the invention, as embodied and broadly described herein, the invention provides a transmission convergence sublayer circuit. When the data stream enable signal terminal of a deframer is enabled, the transmission convergence sublayer circuit receives data cells from the deframer. The data cells comprise of a number of byte groups including a header and a payload. The transmission convergence sublayer circuit includes a byte-wise data pipeline, a header cyclic redundancy checker, an idle cell identifier, a cell delineation state machine, a byte pointer, a descrambler and a write-in buffer controller. The byte-wise data pipeline sequentially picks up and holds byte data temporarily. The header cyclic redundancy checker receives the byte data and issues a syndrome code to indicate whether a header appears in the data. The idle cell identifier determines if the data received by the byte-wise data pipeline include a non-idle data cell. The cell delineation state machine determines the transmission state of the data cells according to the content and frequency of the syndrome code and submits a state signal to indicate the current state. The state signal distinguishes between a searching state and a complete synchronization state. The byte pointer provides sequence labels to those bytes belonging to the data cell newly picked up by the byte-wise data pipeline. Since the newly received bytes are subsequently transformed into double word groups, the sequence labels serve as address pointers for transferring the double word groups to a buffer. The descrambler descrambles the byte groups temporarily hold up in the byte-wise data pipeline and transfers the results to the buffer. The write-in buffer controller writes the descrambled data into the buffer according to the indication provided by the byte pointer when the idle cell identifier and the cell delineation state machine grant the permission to do so.

This invention also provides an operating method of the transmission convergence sublayer of an asynchronous transmission receiver for receiving data cells from a deframer and data stream enable signal. The data cell comprises multiple-byte groups belonging either to a header or a payload. The operating method includes the following steps. First, a byte-wise data pipeline receives bytes of data. The byte-wise data pipeline sequentially picks up data bytes and stores a specified number of bytes temporarily. A header cyclic redundancy checker receives the data bytes synchronously, determines if a header is present in the data and submits a syndrome code that indicates the presence or absence of a header. According to the syndrome code, a cell delineation state machine determines if a state transition from a searching state to a completely synchronized state is carried out. If the cell delineation state machine effects a state transition to the completely synchronized state, a descrambler descrambles data bytes in the byte-wise data pipeline that have a capacity to decode a double word group. A byte pointer outputs a pointer signal according to the state indicated by the cell delineation state machine. The pointer signal indicates the sequence number of the newly received bytes within the data cell and the address for storing data decoded by the descrambler.

In brief, this invention provides an optimized circuit design for synchronizing reception of data and conducting header inspection, data descrambling as well as data format rearrangement in the shortest possible time.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 14 is a lookup reference table for modifying bit errors; and

DETAILED DESCRIPTION

Figure 1:
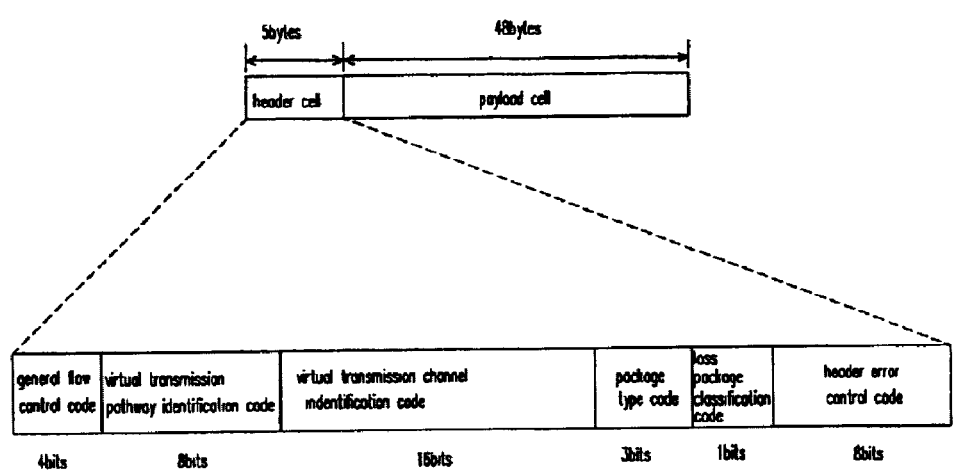
FIG. 1 shows the data format of cell data processed by the transmission convergence sublayer at the transmission terminal working in the asynchronous transfer mode.

Reference will now be made in detail to the present preferred embodiments of the invention, examples of which are illustrated in the accompanying drawings. Wherever possible, the same reference numbers are used in the drawings and the description to refer to the same or like parts.

Figure 3:
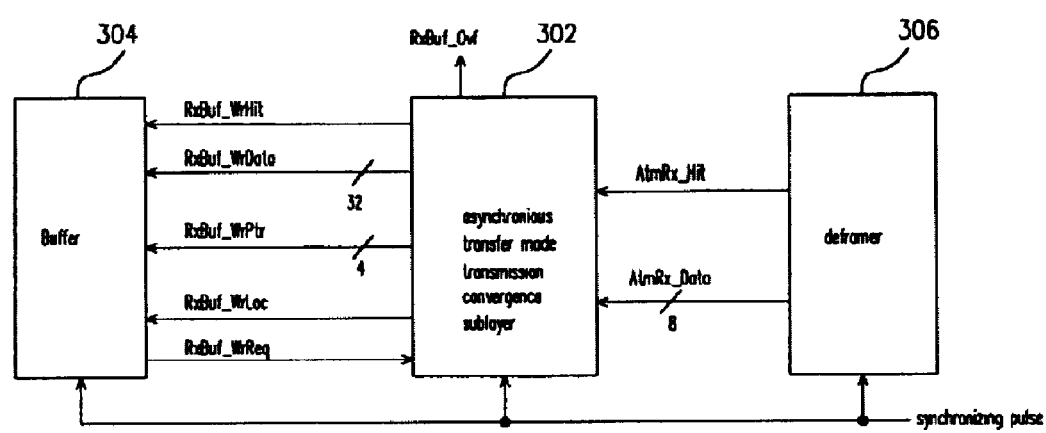
FIG. 3 is a block diagram showing a conventional system comprising a buffer, a transmission convergence sublayer and a deframer.

FIG. 3 is a block diagram showing a system comprising a buffer, a transmission convergence sublayer and a deframer. As shown in FIG. 3, an asynchronous transfer mode transmission convergence sublayer 302 is coupled to a buffer 304 (in this embodiment, data is accessed according to a first-in first-out rule) and a deframer 306. The asynchronous transfer mode transmission convergence sublayer 302, the buffer 304 and the deframer 306 all receive and operate according to the same synchronizing pulse. The deframer 306 outputs bytes of data stream AtmRx_Data and data stream enable signal AtmRx_Hit to the asynchronous transfer mode transmission convergence sublayer 302. The asynchronous transfer mode transmission convergence sublayer 302 receives the data stream AtmRx_Data from the descrambler 306 and searches for the header through a comparison with the header cyclic redundancy code. Thereafter, synchronized reception of data cells is conducted. When the reception of data cells is synchronized, comparison of the header cyclic redundancy code with a newly received data cell continues. In the meantime, payload data within the data cell are also descrambled. If the data cell is identified to be a non-idle cell, the header cyclic redundancy code within the data cell is removed and a byte format is transformed into a multiple-byte format (32 bits are used in this embodiment, that is, a double word). According to the 4-bit pointer address RxBuf_WrPtr corresponding to the multiple-byte data and write grant signal RxBuf_WrReq from the buffer 304, data cells converted to multiple-byte format are written into the buffer 304 as a data stream RxBuf_WrData. When the last batch of multiple-byte data (the 12$^{th}$ batch) of the data cell is submitted, the asynchronous transfer mode transmission convergence sublayer 302 issues a reminder signal RxBuf_WrLoc to the buffer 304 to serve as a cumulative indexing mechanism for a write-in cell pointer (not shown). However, if the asynchronous transfer mode transmission convergence sublayer 302 needs to write non-idle data cells into the buffer 304 but the asynchronous transfer mode transmission convergence sublayer 302 has received no write-in grant signal RxBuf_WrReq from the buffer 304, the asynchronous transfer mode transmission convergence sublayer 302 will submit an overflow reminder signal RxBuf_Ovf to an upper layer unit (not shown) and terminate any writing of data cells into the buffer 304.

Figure 4:
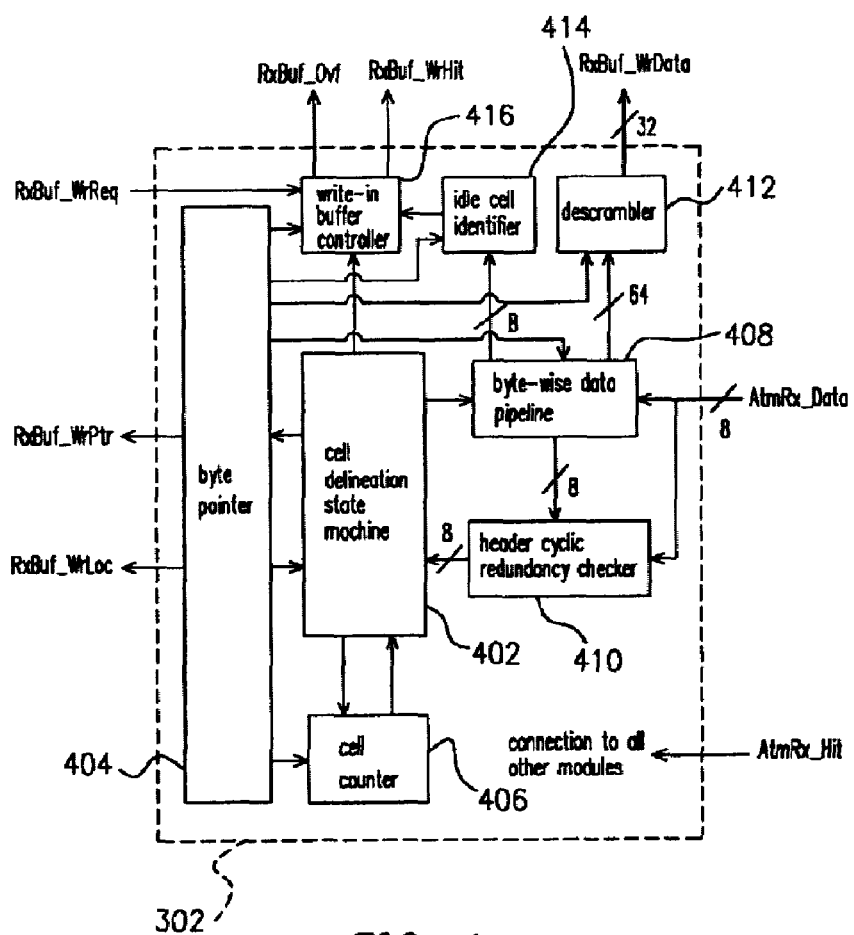
FIG. 4 is a block diagram showing a transmission convergence sublayer system for receiving asynchronous transfer according to a first embodiment of this invention.

FIG. 4 is a block diagram showing a transmission convergence sublayer system for receiving asynchronous transfer according to a first embodiment of this invention. As shown in FIG. 4, a cell delineation state machine inside the asynchronous transfer mode transmission convergence sublayer 302 receives a data stream enable signal AtmRx_Hit from a deframer (not shown), a counter signal from a cell counter 406, a syndrome code from a header cyclic redundancy checker 410 and an pointer signal from a byte pointer 404. The data stream enable signal AtmRx_Hit controls the operation of the cell delineation state machine 402. According to the counter signal, the syndrome code and the pointer signal, the cell delineation state machine 402 decides if the current state needs to be changed and transmits a plurality of state signals to other devices.

Figure 5A:
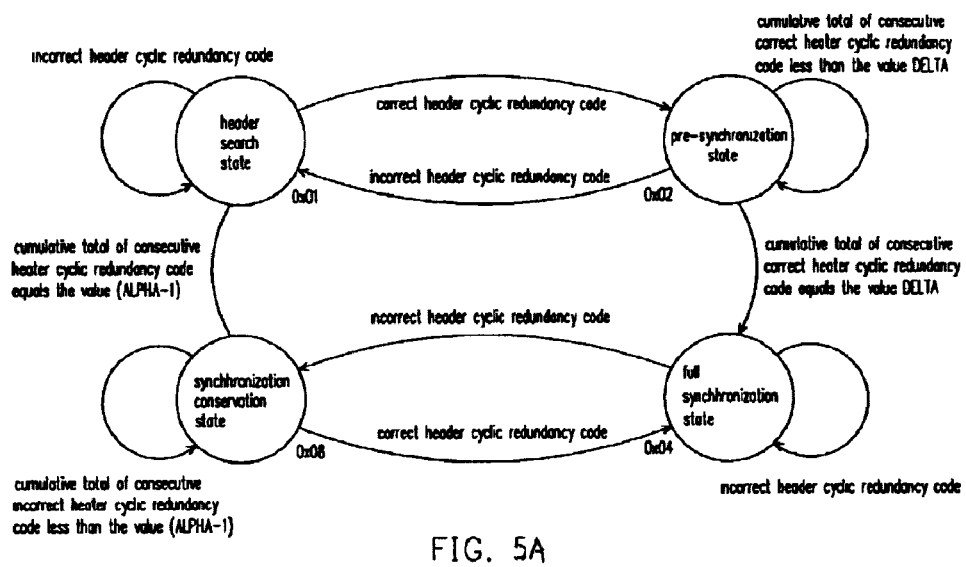
FIG. 5A is a diagram showing all the possible states of the cell delineation state machine according to this invention.

FIG. 5A is a diagram showing all the possible states of the cell delineation state machine according to this invention. As shown in FIG. 5A, the cell delineation state machine 402 includes a plurality of states for determining the work that currently needs to be performed by the asynchronous transfer mode transmission convergence sublayer 302.

In the header search state, the asynchronous transfer mode transmission convergence sublayer 302 receives consecutive data cells from the deframer (not shown) and the header cyclic redundancy checker 402 carries out a computation of the header of the data cells to find an 8-bit syndrome code. If the cell delineation state machine 402 finds the syndrome code is not 0x00, the cell delineation state machine 402 maintains its current state. On the other hand, if the cell delineation state machine 402 finds the syndrome code to be 0x00, the cell delineation state machine 402 proceeds to a pre-synchronization state.

In the pre-synchronization state, the asynchronous transfer mode transmission convergence sublayer 302 continues to receive consecutive data cells from the deframer (not shown) and the header cyclic redundancy checker 410 continues to carry out header computation to find the syndrome code. If the cell delineation state machine 402 finds the syndrome code within the consecutive data cells is not 0x00, the asynchronous transfer mode transmission convergence sublayer 302 returns to the header search state. On the other hand, if the cell delineation state machine 402 finds the syndrome code to be 0x00, the asynchronous transfer mode transmission convergence sublayer 302 maintains the original state and increments the pre-synchronization state counter. When the counter reaches a value DELTA after receiving the consecutive data cells, the asynchronous transfer mode transmission convergence sublayer 302 proceeds into a full synchronization state.

In the full synchronization state, the asynchronous transfer mode transmission convergence sublayer 302 continues to receive consecutive data cells from the deframer (not shown) and the header cyclic redundancy checker 410 continues to carry out header computations to find the syndrome code. If the syndrome code is 0x00, the cell delineation state machine 402 maintains the original state and removes the header cyclic redundancy code within the header utilizing the byte pointer 404 and the byte-wise data pipeline 408. The payload within the data cell is extracted and descrambled by the descrambler 412. The word group format is transformed into double word format. The transformed double word format data is transferred to the buffer (not shown). On the other hand, if the cell delineation state machine 402 finds that the syndrome code computed from header computation of the consecutively received data cells is not 0x00, the asynchronous transfer mode transmission convergence sublayer 302 proceeds into a synchronization conservation state.

In the synchronization conservation state, the asynchronous transfer mode transmission convergence sublayer 302 continues to receive consecutive data cells from the deframer (not shown) and the header cyclic redundancy checker 410 continues to carry out header computation to obtain the syndrome code. If the cell delineation state machine 402 finds the syndrome code is 0x00, the asynchronous transfer mode transmission convergence sublayer 302 returns to the full synchronization state. On the other hand, if the syndrome code is not 0x00, the asynchronous transfer mode transmission convergence sublayer 302 maintains its original state and increments the synchronization conservation state counter. Within the synchronization conservation state, when the number of non-specialized syndrome code of the received data cell accumulates to a value ALPHA-1, the asynchronous transfer mode transmission convergence sublayer 302 proceeds into the header search state.

Figure 5B:
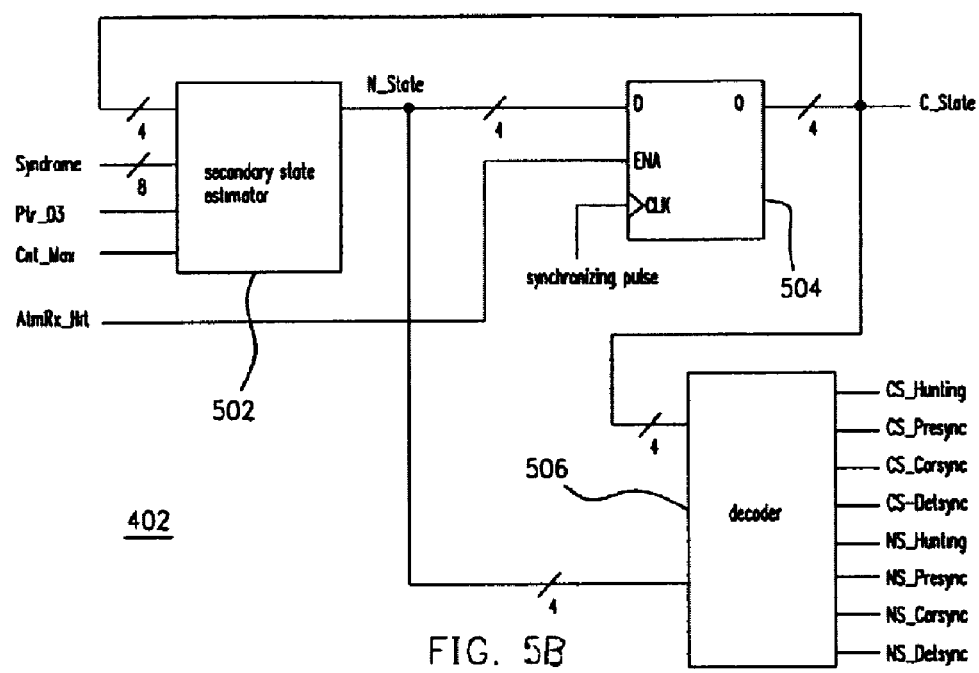
FIG. 5B is a block diagram showing a circuit implementation of the cell delineation state machine according to this invention.

FIG. 5B is a block diagram showing a circuit implementation of the cell delineation state machine according to this invention. As shown in FIG. 5B, under various states, a secondary state estimator 502 inside the cell delineation state machine 402 performs an estimation to produce a secondary state code N_State according to the current state code C_State from a D-type flip-flop 504, the counter signal Cnt_Max from the cell counter 406 (refer to FIG. 4), the syndrome code from the header cyclic redundancy checker 410 (refer to FIG. 4) and the pointer signal Ptr_03 from the byte pointer 404 (refer to FIG. 4). For example in FIG. 5A, assume the current state is pre-synchronization state having a state code of 0x02. When the pointer signal Ptr_03 is "1" (a high potential) and the number of times the syndrome code computed from the header of consecutively received data cells is 0x00 accumulates to the value DELTA, the cell counter 406 issues a count signal Cnt_Max "1" so that the secondary state code N_State becomes 0x04 (that is, a full synchronization state).

The deframer 306 (refer to FIG. 3) issues a data stream enable signal AtmRx_Hit to enable the D-type flip-flop 504. In a synchronizing pulse cycle, the secondary state code N_State fed to the input terminal D of the D-type flip-flop 504 serves as the current state code C_State at the output terminal Q of the D-type flip-flop 504.

A decoder 506 receives the current state code C_State from the output terminal of the D-type flip-flop 504 and the secondary state code N_State from the secondary state estimator 502 and decodes them into a plurality of current state signals (such as CS_Hunting, CS_Presync, CS_Corsync and CS_Detsync as shown in FIG. 5B) and a plurality of secondary state signals (such as NS_Hunting, NS_Presync, NS_Corsync and NS_Detsync as shown in FIG. 5B). If the state is pre-synchronization state as aforesaid and the secondary state is full synchronization state, the current state signal CS_Presync and the secondary state signal NS_Corsync are at logic "1" potential while the rest of the signals are at logic "0" potential (a low level).

In FIG. 4, the cell counter 406 is coupled to the cell delineation state machine 402 and the byte pointer 404. The deframer 306 (refer to FIG. 3) transmits the data stream enable signal AtmRx_Hit to enable the cell counter 406. The cell counter 406 receives the pointer signal Ptr_03 from the byte pointer 404 and the state signal CS_Hunting and CS_Corsync from the cell delineation state machine 402. The cell counter 406 also determines if the cumulative counter value reaches the pre-defined DELTA or ALPHA-1 value according to the state signal CS_Presync. Once the counter counts up to the pre-defined values, a count signal Cnt_Max is sent to the cell delineation state machine 402.

Figure 6:
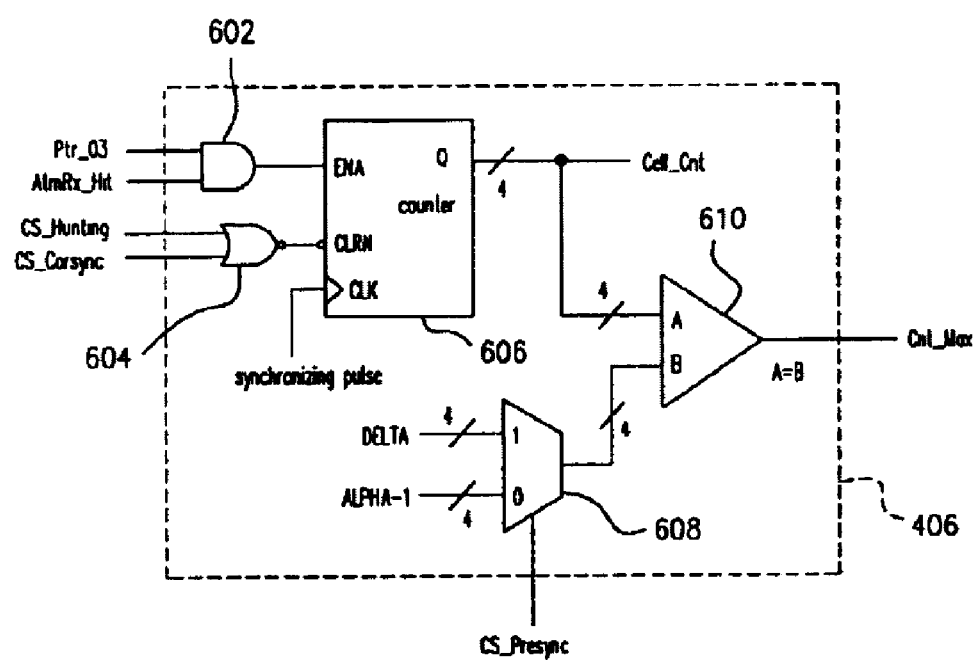
FIG. 6 is a diagram showing a circuit implementation of the cell counter according to one preferred embodiment of this invention.

FIG. 6 is a diagram showing a circuit implementation of the cell counter according to one preferred embodiment of this invention. As shown in FIG. 6, a first input terminal of an AND gate 602 within the cell counter 406 receives the pointer signal Ptr_03 from the byte pointer 404 (refer to FIG. 4), a second input terminal of the AND gate 602 receives the data stream enable signal AtmRx_Hit from the deframer 306 (refer to FIG. 3), and the output terminal of the AND gate 602 submits an ANDed signal to the ENA terminal of a counter 606. A first input terminal of a NOR gate 604 receives the signal CS_Hunting from the cell delineation state machine 402 (refer to FIG. 4). A second input terminal of the NOR gate 604 receives the signal CS_Corsync from the cell delineation state machine 402 (refer to FIG. 4). The output terminal of the NOR gate 604 submits a NORed signal to the CLRN terminal of the counter 606. When the cell delineation state machine 402 (refer to FIG. 4) is in the header search state or a full synchronization state, the NOR gate 604 prevents the counter 606 from counting.

When the clock terminal CLK is operating within a synchronizing pulse cycle, if the ANDed signal sent from the AND gate 602 to the ENA terminal is a logic "1", the 4-bit count value Cell_Cnt at the output terminal Q of the counter 606 will increment by one automatically. If the NORed signal sent from the NOR gate 604 to the CLRN terminal is a logic "0", the 4-bit count value Cell_Cnt at the output terminal Q of the counter 606 will be cleared to zeros.

A first input terminal of a multiplexer 608 within the cell counter 406 receives a DELTA value and a second input terminal of the multiplexer 608 receives an ALPHA-1 value. A selection terminal of the multiplexer 608 picks up the state signal CS_Presync from the cell delineation state machine 402 (refer to FIG. 4) to determine if the output terminal of the multiplexer 608 outputs the DELTA value (when the state signal CS_Presync is at logic "1") or outputs the ALPHA-1 value (when the state signal CS_Presync is at logic "0").

A first input terminal of a comparator 610 within the cell counter 406 receives the count value Cell_Cnt and a second input terminal of the comparator 610 receives the DELTA value or the ALPHA-1 value. If the count value Cell_Cnt is equal to the DELTA value or the ALPHA-1 value, the output terminal of the comparator 610 outputs a count signal Cnt_Max to the cell delineation state machine 402 (refer to FIG. 4).

Figure 7A:
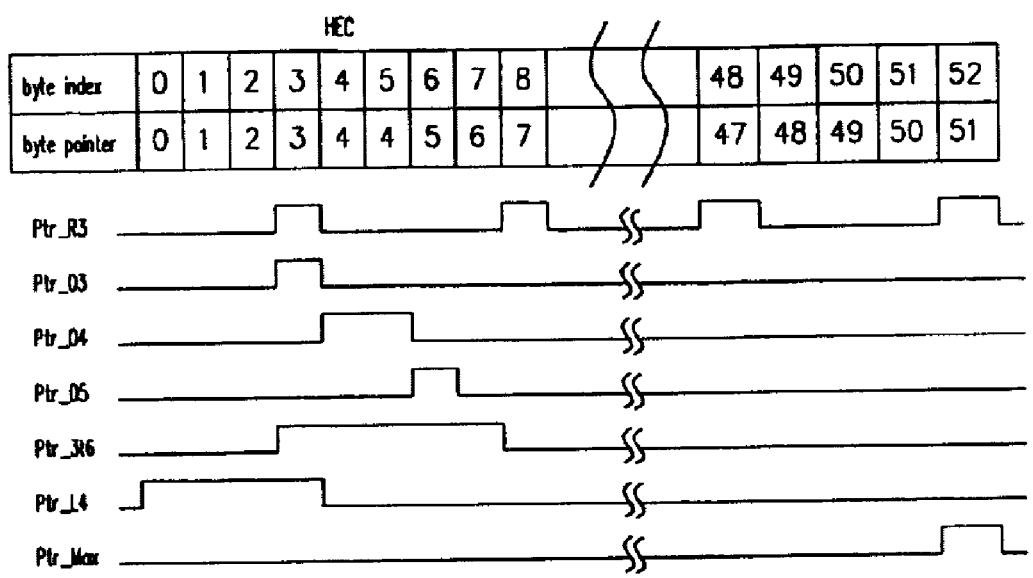
FIG. 7A is a diagram showing the states after the rearrangement of bytes within the data cells into byte addresses and byte pointers.

In FIG. 4, the byte pointer 404 is coupled to the cell delineation state machine Hence, the byte point 404 is capable of receiving a data stream signal AtmRx_Hit from the deframer 306 (refer to FIG. 3) so that the byte pointer 404 is enabled to produce the byte address corresponding to the count value of the current data cell. FIG. 7A is a diagram showing the states after the rearrangement of bytes within the data cell into byte addresses and byte pointers. A complete data cell has 53 bytes. Byte index is labeled from 0~52 and byte pointer is labeled from 0~51 because the byte indexes labeled 4 and 5 are assimilated together and hence having the same byte pointer label 4. With this arrangement, sequence number of the bytes belonging to the newly input data cells transmitted into the byte-wise data pipeline 408 is set up. In addition, the highest 4 bits of the pointer signal output from the byte pointer 404 can be directly retrieved to serve as an indicator showing the sequence number of each batch of double word data within the data cells. Ultimately, address for the batch of double word data can be clearly indicated. Details are further described below.

By repeating the pointer positions of byte 4 and 5, the remaining 52 pointed positions is labeled from 0 to 51. Hence, only 6 bits is necessary to represent the 52 bytes. Therefore, after receiving the $8^{th}$ byte or in other words the first batch of double byte data, the pointer signal will point to the seventh batch, that is, 000111. Taking the highest four bits, a pointer position 0001 that represents the address pointer of the first batch of double word data is obtained. The reason for the possibility of such an arrangement is that the header cyclic redundancy codes are specially added codes for determining if there is any data transmission error during a transmission session rather than data with real applications. Hence, the codes may be removed without any effect on real applications.

Figure 7B:
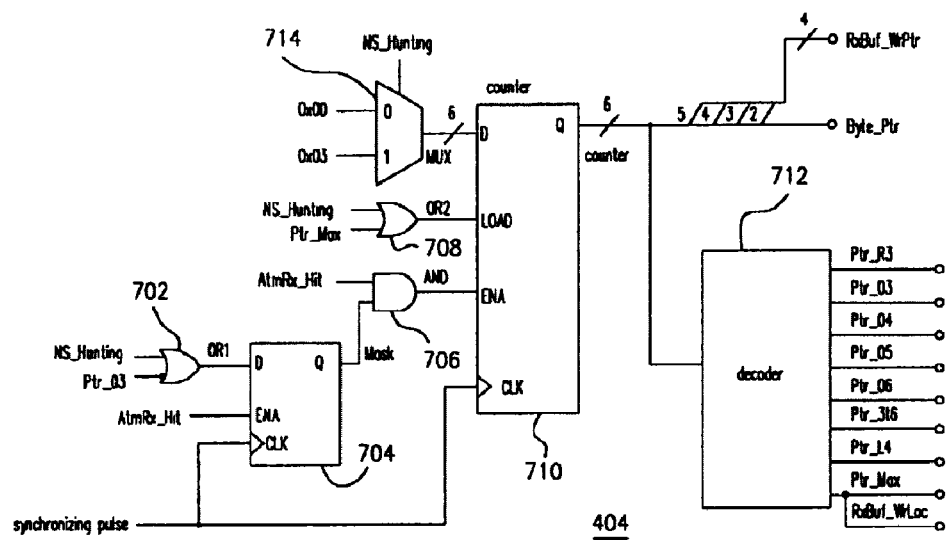
FIG. 7B is a diagram showing a circuit implementation of the byte pointer according to one preferred embodiment of this invention.

FIG. 7B is a diagram showing a circuit implementation of the byte pointer according to one preferred embodiment of this invention. As shown in FIG. 7B, a first input terminal of an OR gate 702 within the byte pointer 404 receives a header search state signal NS_Hunting from the cell delineation state machine 402 (refer to FIG. 4). A second input terminal of the OR gate 702 receives the pointer signal Ptr_03 from a decoder 712. The output terminal of the OR gate 702 outputs an ORed signal OR1.

An input terminal D of a D-type flip-flop 704 within the byte pointer 404 receives the signal OR1. The synchronizing pulse received by the clock terminal CLK and the data cell enable signal AtmRx_Hit received by the ENA terminal of the D-type flip-flop 704 enable the D-type flip-flop to output a mask signal at the output terminal Q.

The "0" input terminal of a multiplexer (MUX) 714 within the byte pointer 404 receives the value 0x00 while the "1" input terminal of the multiplexer 714 receives the value 0x03. The select terminal of multiplexer 714 receives a secondary header search state signal NS_Hunting from the cell delineation state machine 402 (refer to FIG. 4). If the secondary header search state signal NS_Hunting is at a logic state "0", the value 0x00 is output from the output terminal of the multiplexer 714. On the other hand, if the secondary header search state signal NS_Hunting is at a logic state "1", the value 0x03 is output from the output terminal of the multiplexer 714.

A first input terminal of an OR gate 708 within the byte pointer 404 receives the secondary header search state signal NS_Hunting. A second input terminal of the OR gate 708 receives a pointer signal Ptr_Max from the decoder 712. The output terminal of the OR gate 708 outputs an ORed signal OR2. A first input terminal of a NAND gate receives the data stream enable signal AtmRx_Hit. A second input terminal of the OR gate 708 receives the mask signal from the D-type flip-flop 704. The output terminal of the AND gate outputs an ANDed signal to the ENA terminal of a counter 710.

An input terminal D of the counter 710 within the byte pointer 404 receives the 6-bit multiplexed (MUX) signal from the multiplexer 714. The LOAD terminal of the counter 710 receives the ORed signal OR2 from the OR gate 708 and the clock CLK terminal of the counter 710 receives a synchronizing pulse. The ENA terminal of the counter 710 receives the signal AND from the AND gate 706. The output terminal Q of the counter 710 outputs a 6-bit count value Byte_Ptr. During a cycle of synchronizing pulse applied to the CLK terminal, if the OR gate signal OR2 and the AND gate signal is are both in a logic state "1", the output terminal Q outputs a multiplex signal MUX. The four highest effective bits of data from the count value Byte_Ptr serves as a signal PtrBuf_WrPtr. The signal PtrBuf_WrPtr is sent to the buffer 304 (refer to FIG. 3) serving as an address for the data cell.

After receiving the position pointer Byte_Ptr, the decoder 712 within the byte pointer 404 decodes the position pointer Byte_Ptr into several pointer signals and provides logic decision support to various modules in the transmission convergence sublayer. The states of these pointer signals are shown in FIG. 7A.

In FIG. 4, the header cyclic redundancy checker 410 is coupled to the cell delineation state machine 402 for receiving the header within the consecutive data cells (as shown in FIG. 1) and computing out the 5 bytes of header data using the polynomial $X^8+X^2+X+1$. Hence, a syndrome code is obtained. According to whether the syndrome code has a value 0x00 or not, correctness of the header within the data cells in a data transmission can be determined.

Figure 2A:
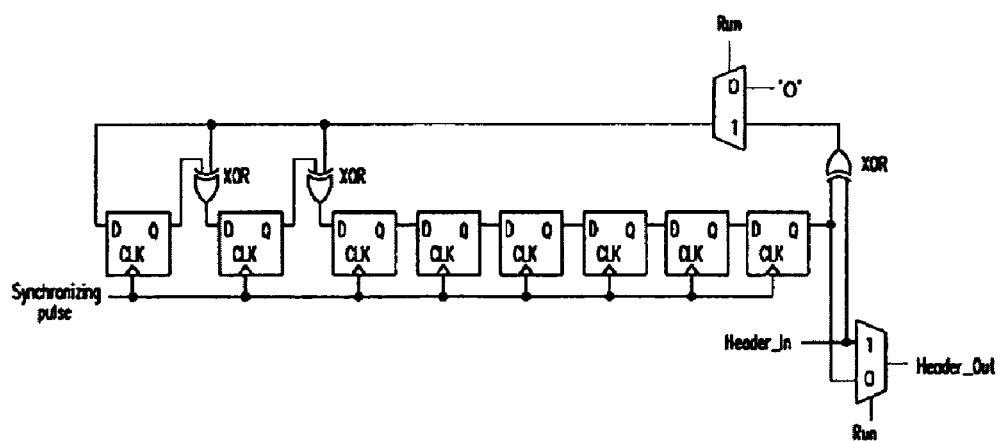
FIG. 2A is a block diagram showing a conventional method of using a header cyclic redundancy code generator at the emission terminal to produce header cyclic redundancy code.
Figure 2B:
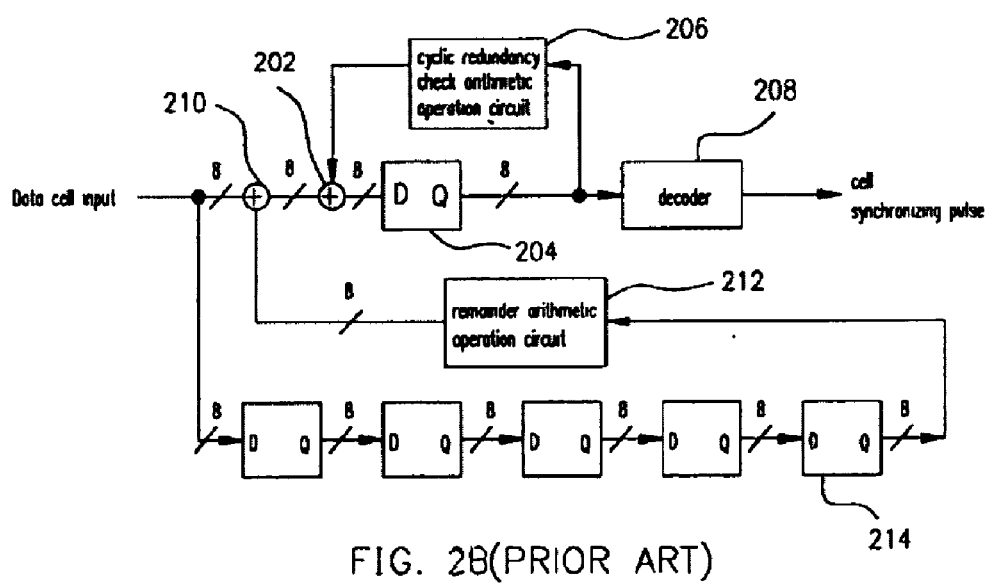
FIG. 2B is a block diagram showing a conventional data cell synchronizing circuit for a receiver terminal operating in an asynchronous transfer mode.
Figure 8A:
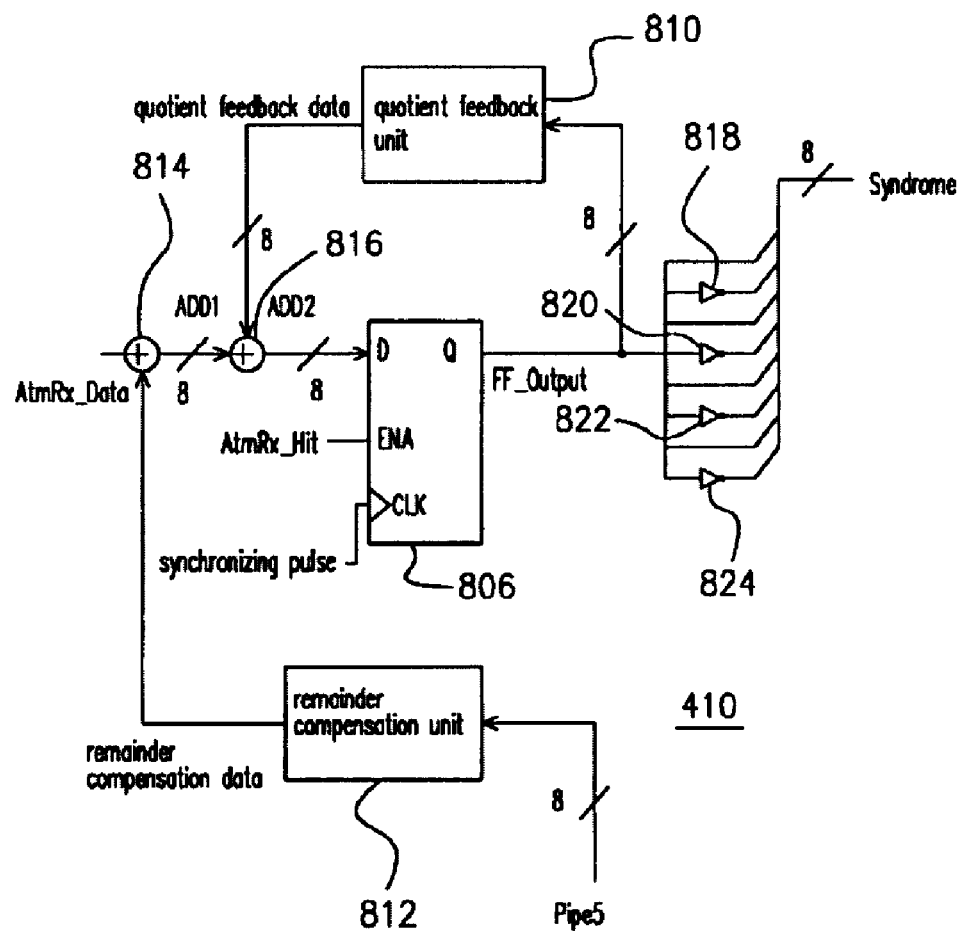
FIG. 8A is a diagram showing a circuit implementation of the header cyclic redundancy checker according to one preferred embodiment of this invention.

FIG. 8A is a diagram showing a circuit implementation of the header cyclic redundancy checker according to one preferred embodiment of this invention. As shown in FIG. 8A, a remainder compensation unit 812 within the header cyclic redundancy checker 410 receives the bytes Pipe5 submitted by the byte-wise data pipeline 408 (refer to FIG. 4). The remainder compensation unit 812 conducts a XOR computation of the bytes Pipe5 to obtain remainder compensation data. Since bytes are temporarily stored in the byte-wise data pipeline 408, conventional flip-flop registers like the one shown in FIG. 2B is not required.

A modulo 2 adder 814 within the header cyclic redundancy checker 410 adds together the header bytes provided by the data stream AtmRx_Data from the deframer 306 (refer to FIG. 3) and the remainder compensation data to form byte data ADD1. A second modulo 2 adder 816 adds together the byte data ADD1 and the quotient feedback data from a quotient feedback unit 810 to form byte data ADD2.

The clock terminal CLK of a D-type flip-flop 806 receives a synchronizing pulse and the enable terminal ENA of the D-type flip-flop 806 receives the data stream enable signal AtmRx_Hit from the deframer 306 (refer to FIG. 3) so that the D-type flip-flop 806 is enabled. The output terminal Q of the D-type flip-flop 806 outputs flip-flop data FF_Output within a synchronizing pulse cycle.

The quotient feedback unit 810 within the header cyclic redundancy checker 410 conducts a XOR operation on the flip-flop data FF_Output from the D-type flip-flop 806 to produce the quotient feedback data. Inverters 818, 820, 822 and 824 conducts an inversion operation on the sixth, the fourth, the second and the zeroth bit of the flip-flop data FF_Output from the D-type flip-flop 806. After the inversion operation, the inverted bits and the non-inverted bits (the seventh, the fifth, the third and the first bit) of the flip-flop data FF_Output are combined together to form a syndrome code.

In FIG. 1, to ensure the received data cells are correct, the reception system introduces an 8-bit header cyclic redundancy code into the 5 byte header. The quotient feedback unit 810 as shown in FIG. 8A processes the header byte data. The quotient feedback unit 810 conducts a division operation using the polynomial $X^8+X^2+X+1$ to produce the quotient feedback data. The quotient feedback data and the data stream AtmRx_Data as well as the remainder compensation data undergo modulo 2 additions by the modulo 2 adders 814 and 816 and the partially inverted by the inverters 818, 820, 822 and 824 to form the syndrome code. If the header of consecutively received data cells produces a syndrome code 0x00, correct consecutive header cells are implied and hence data cell reception may go ahead. On the contrary, if the syndrome code is different from 0x00, search for correct header is continued.

In FIG. 8A, the header within a data cell and the payload will be fed to the circuit in sequence. Only the syndrome code computed from the header is meaningful. The payload data is modified by the remainder compensation unit 812 through the acquisition of data Pipe5 from the byte-wise data pipeline 408.

Figure 8B:
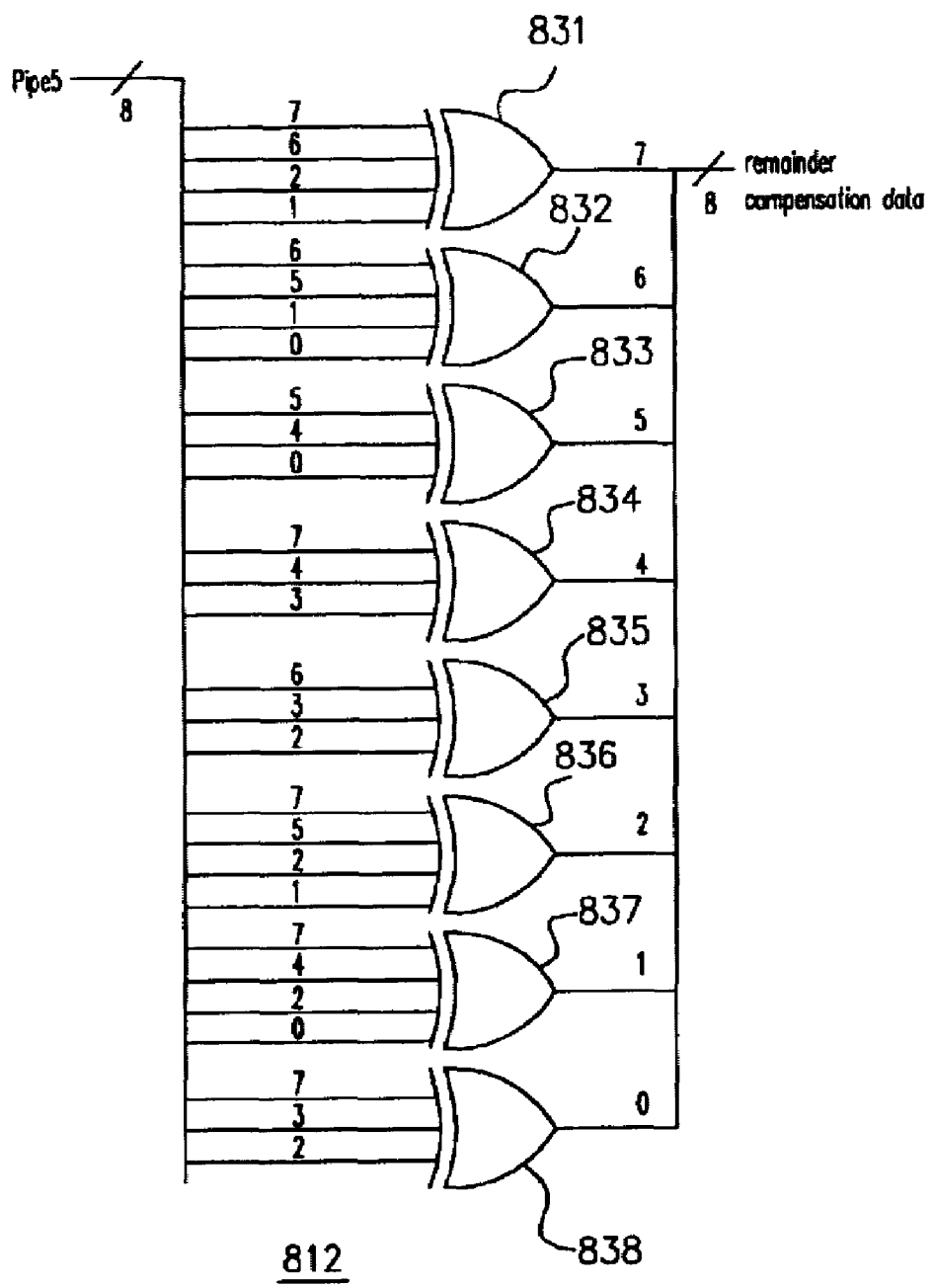
FIG. 8B is a diagram showing a circuit implementation of the remainder compensation unit according to one preferred embodiment of this invention.

FIG. 8B is a diagram showing a circuit implementation of the remainder compensation unit according to one preferred embodiment of this invention. As shown in FIG. 8B, a first input terminal of a XOR gate 831 within the remainder compensation unit 812 receives the seventh bit of byte data Pipe5, a second input terminal receives the sixth bit of byte data Pipe5, a third input terminal receives the second bit of the byte data Pipe5 and a fourth input terminal receives the first bit of the byte data pipe5. The XOR gate 831 conducts a XOR operation and outputs from its output terminal the seventh bit of the remainder compensation data.

A first input terminal of a XOR gate 832 receives the sixth bit of byte data Pipe5, a second input terminal receives the fifth bit of byte data Pipe5, a third input terminal receives the first bit of the byte data Pipe5 and a fourth input terminal receives the zeroth bit of the byte data pipe5. The XOR gate 832 conducts a XOR operation and outputs from its output terminal the sixth bit of the remainder compensation data.

A first input terminal of a XOR gate 833 receives the fifth bit of byte data Pipe5, a second input terminal receives the fourth bit of byte data Pipe5 and a third input terminal receives the zeroth bit of the byte data Pipe5. The XOR gate 833 conducts a XOR operation and outputs from its output terminal the fifth bit of the remainder compensation data.

A first input terminal of a XOR gate 834 receives the seventh bit of byte data Pipe5, a second input terminal receives the fourth bit of byte data Pipe5 and a third input terminal receives the third bit of the byte data Pipe5. The XOR gate 834 conducts a XOR operation and outputs from its output terminal the fourth bit of the remainder compensation data.

A first input terminal of a XOR gate 835 receives the sixth bit of byte data Pipe5, a second input terminal receives the third bit of byte data Pipe5 and a third input terminal receives the second bit of the byte data Pipe5. The XOR gate 835 conducts a XOR operation and outputs from its output terminal the third bit of the remainder compensation data.

A first input terminal of a XOR gate 836 receives the seventh bit of byte data Pipe5, a second input terminal receives the fifth bit of byte data Pipe5, a third input terminal receives the second bit of the byte data Pipe5 and a fourth input terminal receives the first bit of the byte data pipe5. The XOR gate 836 conducts a XOR operation and outputs from its output terminal the second bit of the remainder compensation data.

A first input terminal of a XOR gate 837 receives the seventh bit of byte data Pipe5, a second input terminal receives the fourth bit of byte data Pipe5, a third input terminal receives the second bit of the byte data Pipe5 and a fourth input terminal receives the zeroth bit of the byte data pipe5. The XOR gate 837 conducts a XOR operation and outputs from its output terminal the first bit of the remainder compensation data.

A first input terminal of a XOR gate 838 receives the seventh bit of byte data Pipe5, a second input terminal receives the third bit of byte data Pipe5 and a third input terminal receives the second bit of the byte data Pipe5. The XOR gate 838 conducts a XOR operation and outputs from its output terminal the zeroth bit of the remainder compensation data.

Figure 8C:
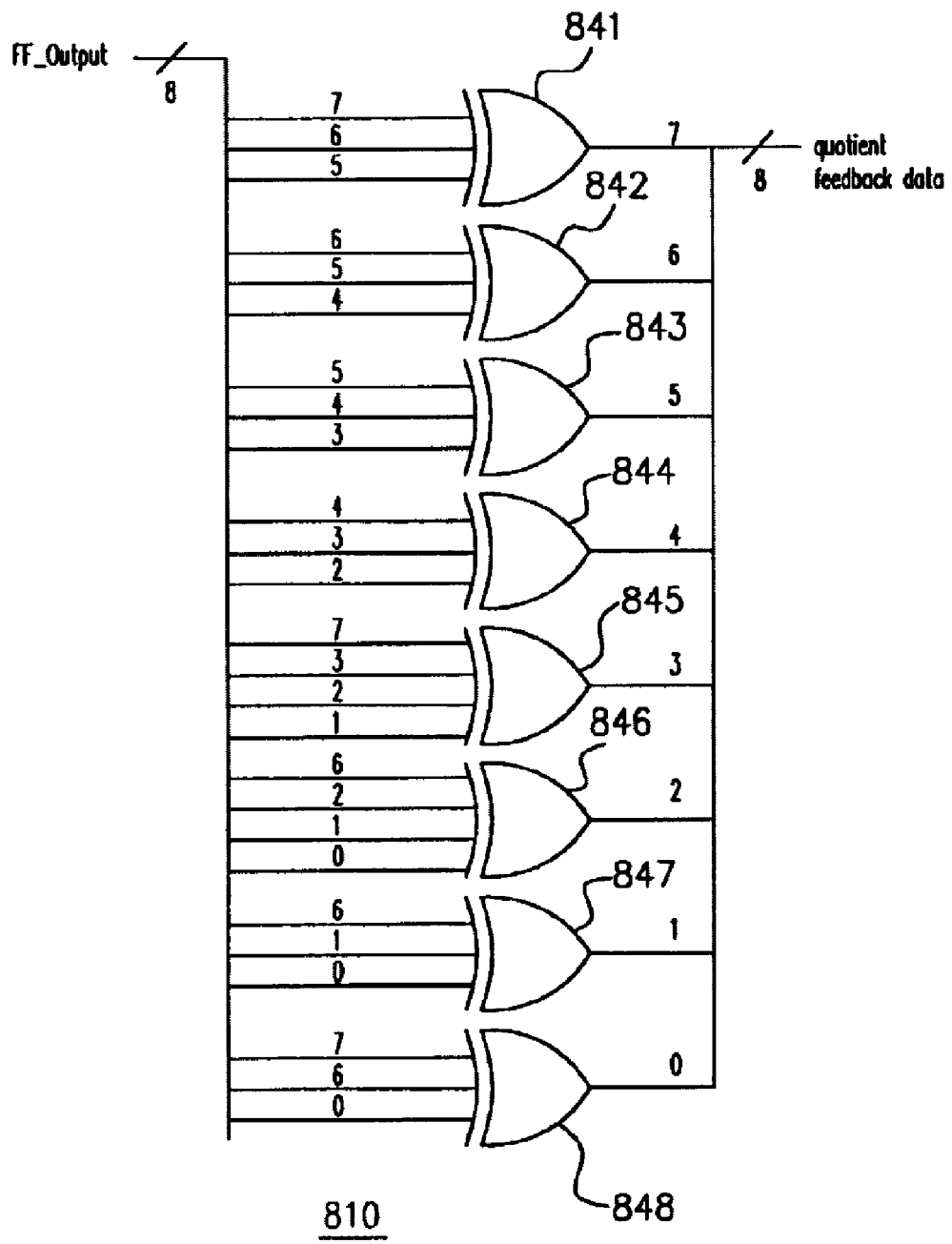
FIG. 8C is a diagram showing a circuit implementation of the quotient feedback unit according to one preferred embodiment of this invention.

FIG. 8C is a diagram showing a circuit implementation of the quotient feedback unit according to one preferred embodiment of this invention. As shown in FIG. 8C, a first input terminal of a XOR gate 841 within the quotient feedback unit 810 receives the seventh bit of the flip-flop data FF_Output, a second input terminal receives the sixth bit of the flip-flop data FF_Output and a third input terminal receives the fifth bit of the flip-flop data FF_Output. The XOR gate 841 conducts a XOR operation and outputs from its output terminal the seventh bit of the quotient feedback data.

A first input terminal of a XOR gate 842 receives the sixth bit of the flip-flop data FF_Output, a second input terminal receives the fifth bit of the flip-flop data FF_Output and a third input terminal receives the fourth bit of the flip-flop data FF_Output. The XOR gate 842 conducts a XOR operation and outputs from its output terminal the sixth bit of the quotient feedback data.

A first input terminal of a XOR gate 843 receives the fifth bit of the flip-flop data FF_Output, a second input terminal receives the fourth bit of the flip-flop data FF_Output and a third input terminal receives the third bit of the flip-flop data FF_Output. The XOR gate 843 conducts a XOR operation and outputs from its output terminal the fifth bit of the quotient feedback data.

A first input terminal of a XOR gate 844 receives the fourth bit of the flip-flop FF_Output, a second input terminal receives the third bit of the flip-flop data FF_Output and a third input terminal receives the second bit of the flip-flop data FF_Output. The XOR gate 844 conducts a XOR operation and outputs from its output terminal the fourth bit of the quotient feedback data.

A first input terminal of a XOR gate 845 receives the seventh bit of the flip-flop data FF_Output, a second input terminal receives the third bit of the flip-flop data FF_Output, a third input terminal receives the second bit of the flip-flop data FF_Output and a fourth input terminal receives the first bit of the flip-flop data FF_Output. The XOR gate 845 conducts a XOR operation and outputs from its output terminal the third bit of the quotient feedback data.

A first input terminal of a XOR gate 846 receives the sixth bit of the flip-flop data FF_Output, a second input terminal receives the second bit of the flip-flop data FF_Output, a third input terminal receives the first bit of the flip-flop data FF_Output and a fourth input terminal receives the zeroth bit of the flip-flop data FF_Output. The XOR gate 846 conducts a XOR operation and outputs from its output terminal the second bit of the quotient feedback data.

A first input terminal of a XOR gate 847 receives the sixth bit of the flip-flop data FF_Output, a second input terminal receives the first bit of the flip-flop data FF_Output and a third input terminal receives the zeroth bit of the flip-flop data FF_Output. The XOR gate 847 conducts a XOR operation and outputs from its output terminal the first bit of the quotient feedback data.

A first input terminal of a XOR gate 848 receives the seventh bit of the flip-flop data FF_Output, a second input terminal receives the sixth bit of the flip-flop data FF_Output and a third input terminal receives the zeroth bit of the flip-flop data FF_Output. The XOR gate 848 conducts a XOR operation and outputs from its output terminal the zeroth bit of the quotient feedback data.

Figure 8D:
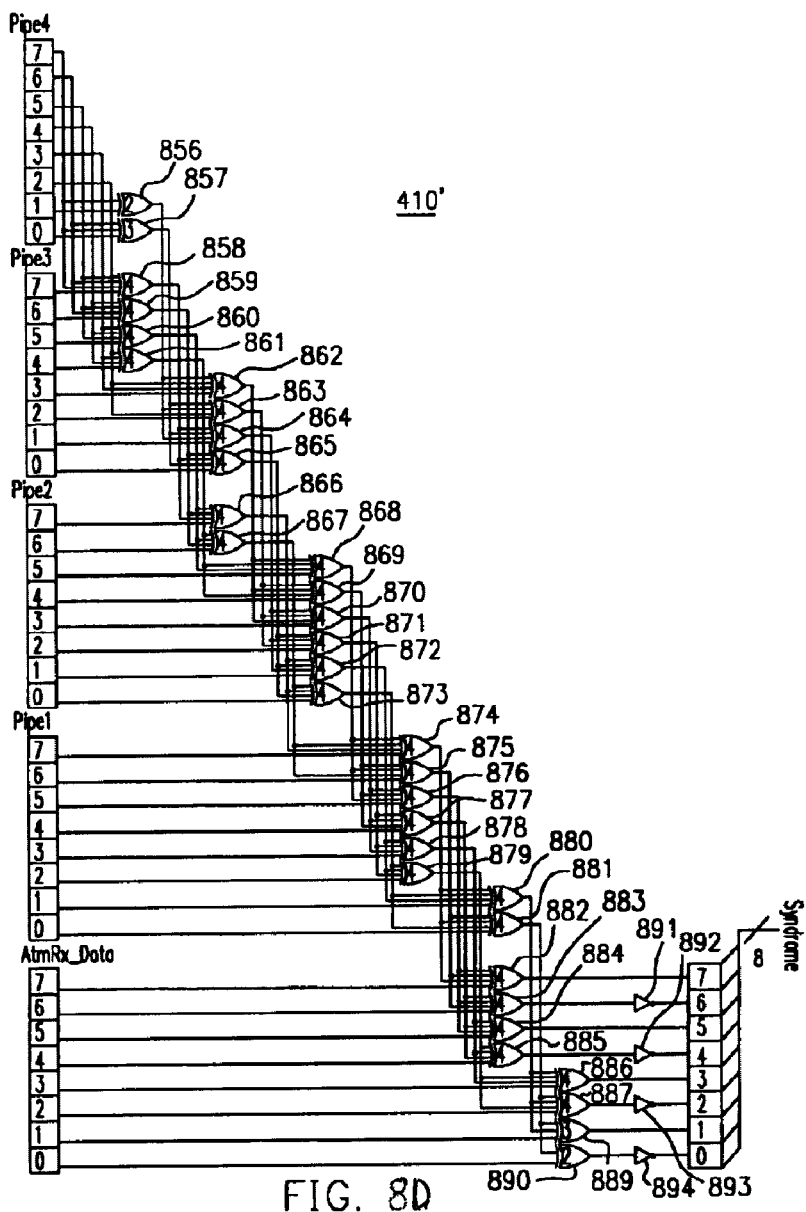
FIG. 8D is a diagram showing a circuit implementation of the header cyclic redundancy checker according to another preferred embodiment of this invention.

FIG. 8D is a diagram showing a circuit implementation of the header cyclic redundancy checker according to another preferred embodiment of this invention. As shown in FIG. 8D, a first input terminal of a XOR gate 856 within the header cyclic redundancy checker 410" receives the seventh bit of the byte Pipe4 from the byte-wise data pipeline 408 (FIG. 8D reference FIG. 4) and a second input terminal receives the first bit of the byte Pipe4 from the byte-wise data pipeline 408. The XOR gate 856 outputs from its output terminal a first XOR signal.

A first input terminal of a XOR gate 857 receives the sixth bit of the byte Pipe4 from the byte-wise data pipeline 408, a second input terminal receives the seventh bit of the byte Pipe4 from the byte-wise data pipeline 408 and a third input terminal receives the zeroth bit of the byte Pipe4 from the byte-wise data pipeline 408. The XOR gate 857 outputs from its output terminal a second XOR signal.

A first input terminal of a XOR gate 858 receives the fifth bit of the byte Pipe4 from the byte-wise data pipeline 408, a second input terminal receives the sixth bit of the byte Pipe4 from the byte-wise data pipeline 408, a third input terminal receives the seventh bit of the byte Pipe4 from the byte-wise data pipeline 408 and a fourth input terminal receives the seventh bit of the byte Pipe3 from the byte-wise data pipeline. The XOR gate 858 outputs from its output terminal a third XOR signal.

A first input terminal of a XOR gate 859 receives the fourth bit of the byte Pipe4 from the byte-wise data pipeline 408, a second input terminal receives the fifth bit of the byte Pipe4 from the byte-wise data pipeline 408, a third input terminal receives the sixth bit of the byte Pipe4 from the byte-wise data pipeline 408 and a fourth input terminal receives the sixth bit of the byte Pipe3 from the byte-wise data pipeline. The XOR gate 859 outputs from its output terminal a fourth XOR signal.

A first input terminal of a XOR gate 860 receives the third bit of the byte Pipe4 from the byte-wise data pipeline 408, a second input terminal receives the fourth bit of the byte Pipe4 from the byte-wise data pipeline 408, a third input terminal receives the fifth bit of the byte Pipe4 from the byte-wise data pipeline 408 and a fourth input terminal receives the fifth bit of the byte Pipe3 from the byte-wise data pipeline. The XOR gate 860 outputs from its output terminal a fifth XOR signal.

A first input terminal of a XOR gate 861 receives the second bit of the byte Pipe4 from the byte-wise data pipeline 408, a second input terminal receives the third bit of the byte Pipe4 from the byte-wise data pipeline 408, a third input terminal receives the fourth bit of the byte Pipe4 from the byte-wise data pipeline 408 and a fourth input terminal receives the fourth bit of the byte Pipe3 from the byte-wise data pipeline. The XOR gate 861 outputs from its output terminal a sixth XOR signal.

A first input terminal of a XOR gate 862 receives the first XOR signal, a second input terminal receives the second bit of the byte Pipe4 from the byte-wise data pipeline 408, a third input terminal receives the third bit of the byte Pipe4 from the byte-wise data pipeline 408 and a fourth input terminal receives the third bit of the byte Pipe3 from the byte-wise data pipeline 408. The XOR gate 862 outputs from its output terminal a seventh XOR signal.

A first input terminal of a XOR gate 863 receives the second XOR signal, a second input terminal receives the first XOR signal, a third input terminal receives the second bit of the byte Pipe4 from the byte-wise data pipeline 408 and a fourth input terminal receives the second bit of the byte Pipe3 from the byte-wise data pipeline 408. The XOR gate 863 outputs from its output terminal an eighth XOR signal.

A first input terminal of a XOR gate 864 receives the third XOR signal, a second input terminal receives the second XOR signal, a third input terminal receives the third XOR signal and a fourth input terminal receives the first bit of the byte Pipe3 from the byte-wise data pipeline 408. The XOR gate 864 outputs from its output terminal a ninth XOR signal.

A first input terminal of a XOR gate 865 receives the fourth XOR signal, a second input terminal receives the third XOR signal, a third input terminal receives the second XOR signal and a fourth input terminal receives the zeroth bit of the byte Pipe3 from the byte-wise data pipeline 408. The XOR gate 865 outputs from its output terminal a tenth XOR signal.

A first input terminal of a XOR gate 866 receives the fifth XOR signal, a second input terminal receives the fourth XOR signal, a third input terminal receives the third XOR signal and a fourth input terminal receives the seventh bit of the byte Pipe2 from the byte-wise data pipeline 408. The XOR gate 866 outputs from its output terminal an eleventh XOR signal.

A first input terminal of a XOR gate 867 receives the sixth XOR signal, a second input terminal receives the fifth XOR signal, a third input terminal receives the fourth XOR signal and a fourth input terminal receives the sixth bit of the byte Pipe2 from the byte-wise data pipeline 408. The XOR gate 867 outputs from its output terminal a twelfth XOR signal.

A first input terminal of a XOR gate 868 receives the seventh XOR signal, a second input terminal receives the sixth XOR signal, a third input terminal receives the fifth XOR signal and a fourth input terminal receives the fifth bit of the byte Pipe2 from the byte-wise data pipeline 408. The XOR gate 868 outputs from its output terminal a thirteenth XOR signal.

A first input terminal of a XOR gate 869 receives the eighth XOR signal, a second input terminal receives the seventh XOR signal, a third input terminal receives the sixth XOR signal and a fourth input terminal receives the fourth bit of the byte Pipe2 from the byte-wise data pipeline 408. The XOR gate 869 outputs from its output terminal a fourteenth XOR signal.

A first input terminal of a XOR gate 870 receives the ninth XOR signal, a second input terminal receives the eighth XOR signal, a third input terminal receives the seventh XOR signal and a fourth input terminal receives the third bit of the byte Pipe2 from the byte-wise data pipeline 408. The XOR gate 870 outputs from its output terminal a fifteenth XOR signal.

A first input terminal of a XOR gate 871 receives the tenth XOR signal, a second input terminal receives the ninth XOR signal, a third input terminal receives the eighth XOR signal and a fourth input terminal receives the second bit of the byte Pipe2 from the byte-wise data pipeline 408. The XOR gate 871 outputs from its output terminal a sixteenth XOR signal.

A first input terminal of a XOR gate 872 receives the eleventh XOR signal, a second input terminal receives the tenth XOR signal, a third input terminal receives the ninth XOR signal and a fourth input terminal receives the first bit of the byte Pipe2 from the byte-wise data pipeline 408. The XOR gate 872 outputs from its output terminal a seventeenth XOR signal.

A first input terminal of a XOR gate 873 receives the twelfth XOR signal, a second input terminal receives the eleventh XOR signal, a third input terminal receives the tenth XOR signal and a fourth input terminal receives the zeroth bit of the byte Pipe2 from the byte-wise data pipeline 408. The XOR gate 873 outputs from its output terminal an eighteenth XOR signal.

A first input terminal of a XOR gate 874 receives the thirteenth XOR signal, a second input terminal receives the twelfth XOR signal, a third input terminal receives the eleventh XOR signal and a fourth input terminal receives the seventh bit of the byte Pipe1 from the byte-wise data pipeline 408. The XOR gate 874 outputs from its output terminal a nineteenth XOR signal.

A first input terminal of a XOR gate 875 receives the fourteenth XOR signal, a second input terminal receives the thirteenth XOR signal, a third input terminal receives the twelfth XOR signal and a fourth input terminal receives the sixth bit of the byte Pipe1 from the byte-wise data pipeline 408. The XOR gate 875 outputs from its output terminal a twentieth XOR signal.

A first input terminal of a XOR gate 876 receives the fifteenth XOR signal, a second input terminal receives the fourteenth XOR signal, a third input terminal receives the thirteenth XOR signal and a fourth input terminal receives the fifth bit of the byte Pipe1 from the byte-wise data pipeline 408. The XOR gate 876 outputs from its output terminal a twenty-first XOR signal.

A first input terminal of a XOR gate 877 receives the sixteenth XOR signal, a second input terminal receives the fifteenth XOR signal, a third input terminal receives the fourteenth XOR signal and a fourth input terminal receives the fourth bit of the byte Pipe1 from the byte-wise data pipeline 408. The XOR gate 877 outputs from its output terminal a twenty-second XOR signal.

A first input terminal of a XOR gate 878 receives the seventeenth XOR signal, a second input terminal receives the sixteenth XOR signal, a third input terminal receives the fifteenth XOR signal and a fourth input terminal receives the third bit of the byte Pipe1 from the byte-wise data pipeline 408. The XOR gate 878 outputs from its output terminal a twenty-third XOR signal.

A first input terminal of a XOR gate 879 receives the eighteenth XOR signal, a second input terminal receives the seventeenth XOR signal, a third input terminal receives the sixteenth XOR signal and a fourth input terminal receives the second bit of the byte Pipe1 from the byte-wise data pipeline 408. The XOR gate 879 outputs from its output terminal a twenty-fourth XOR signal.

A first input terminal of a XOR gate 880 receives the nineteenth XOR signal, a second input terminal receives the eighteenth XOR signal, a third input terminal receives the seventeenth XOR signal and a fourth input terminal receives the first bit of the byte Pipe1 from the byte-wise data pipeline 408. The XOR gate 880 outputs from its output terminal a twenty-fifth XOR signal.

A first input terminal of a XOR gate 881 receives the twentieth XOR signal, a second input terminal receives the nineteenth XOR signal, a third input terminal receives the eighteenth XOR signal and a fourth input terminal receives the zeroth bit of the byte Pipe1 from the byte-wise data pipeline 408. The XOR gate 881 outputs from its output terminal a twenty-sixth XOR signal.

A first input terminal of a XOR gate 882 receives the twenty-first XOR signal, a second input terminal receives the twentieth XOR signal, a third input terminal receives the nineteenth XOR signal and a fourth input terminal receives the seventh bit of the data stream AtmRx_Data. The XOR gate 882 outputs from its output terminal a twenty-seventh XOR signal to serve as the seventh bit of the syndrome code.

A first input terminal of a XOR gate 883 receives the twenty-second XOR signal, a second input terminal receives the twenty-first XOR signal, a third input terminal receives the twentieth XOR signal and a fourth input terminal receives the sixth bit of the data stream AtmRx_Data. The XOR gate 883 outputs from its output terminal a twenty-eighth XOR signal.

A first input terminal of a XOR gate 884 receives the twenty-third XOR signal, a second input terminal receives the twenty-second XOR signal, a third input terminal receives the twenty-first XOR signal and a fourth input terminal receives the fifth bit of the data stream AtmRx_Data. The XOR gate 884 outputs from its output terminal a twenty-ninth XOR signal to serve as the fifth bit of the syndrome code.

A first input terminal of a XOR gate 885 receives the twenty-fourth XOR signal, a second input terminal receives the twenty-third XOR signal, a third input terminal receives the twenty-second XOR signal and a fourth input terminal receives the fourth bit of the data stream AtmRx_Data. The XOR gate 885 outputs from its output terminal a thirtieth XOR signal.

A first input terminal of a XOR gate 886 receives the twenty-fifth XOR signal, a second input terminal receives the twenty-fourth XOR signal, a third input terminal receives the twenty-third XOR signal and a fourth input terminal receives the third bit of the data stream AtmRx_Data. The XOR gate 886 outputs from its output terminal a thirty-first XOR signal to serve as the third bit of the syndrome code.

A first input terminal of a XOR gate 887 receives the twenty-sixth XOR signal, a second input terminal receives the twenty-fifth XOR signal, a third input terminal receives the twenty-fourth XOR signal and a fourth input terminal receives the second bit of the data stream AtmRx_Data. The XOR gate 887 outputs from its output terminal a thirty-second XOR signal.

A first input terminal of a XOR gate 889 receives the twenty-sixth XOR signal, a second input terminal receives the twenty-fifth XOR signal and a third input terminal receives the first bit of the data stream AtmRx_Data. The XOR gate 889 outputs from its output terminal a thirty-third XOR signal to serve as the first bit of the syndrome code.

A first input terminal of a XOR gate 890 receives the twenty-sixth XOR signal and a second input terminal receives the zeroth bit of the data stream AtmRx_Data. The XOR gate 890 outputs from its output terminal a thirty-fourth XOR signal.

An input terminal of an inverter 891 receives the twenty-eight XOR signal and outputs from its output terminal a first inverted signal to serve as the sixth bit of the syndrome code. An input terminal of an inverter 892 receives the thirtieth XOR signal and output from its output terminal a second inverted signal to serve as the fourth bit of the syndrome code. An input terminal of an inverter 893 receives the thirty-second XOR signal and output from its output terminal a third inverted signal to serve as the second bit of the syndrome code. An input terminal of an inverter 894 receives the thirty-fourth XOR signal and output from its output terminal a fourth inverted signal to serve as the zeroth bit of the syndrome code.

In brief, the byte data intercepted by the header cyclic redundancy checker in FIG. 8D is divided by the polynomial $X^8+X^2+X+1$ to produce the syndrome code. In FIG. 8D, the five bytes within the data cell is accessed in parallel for computation. Under this arrangement, compensation of the payload portion of the data cell is unnecessary and the syndrome code thus obtained is identical to the one shown in FIG. 8A.

Figure 8E:
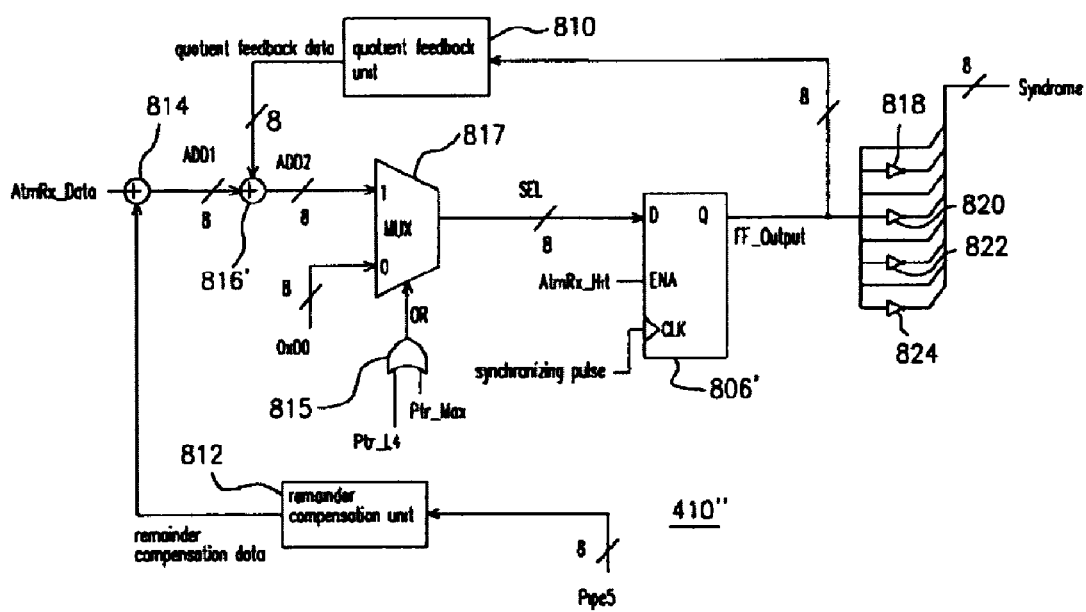
FIG. 8E is a diagram showing a circuit implementation of the header cyclic redundancy checker according to yet another preferred embodiment of this invention.

FIG. 8E is a diagram showing a circuit implementation of the header cyclic redundancy checker according to yet another preferred embodiment of this invention. In FIG. 8E, the header cyclic redundancy checker 410"" differs from the one in FIG. 8A mainly in that an additional energy-saving device comprising a multiplexer 817 and an OR gate 815 is introduced. Input terminals of the OR gate 815 receives the pointer signals Ptr_L4 and Ptr_Max from the byte pointer 404 (refer to FIG. 4) and outputs an ORed signal to the multiplexer 817. The first input terminal "1" of the multiplexer 817 receives the byte data ADD2 from the modulo 2 adder 816" and the second input terminal "0" of the multiplexer 817 receives the byte data 0x00. The output terminal of the multiplexer 817 outputs a multiplexed data byte SEL to the D-type flip-flop 806". The multiplexed data byte SEL is either the byte data ADD2 or the byte data 0x00 selected according to the OR signal from the OR gate 815. Since the rest of the components in FIG. 8E are identical to the ones in FIG. 8A, they are labeled identically and detailed descriptions of the components are not repeated here.

The purpose of incorporating the multiplexer 817 and the OR gate 815 is to save energy. When the transmission convergence sublayer 304 (refer to FIG. 4) is not in a searching state, or in other words, under pre-synchronization, full synchronization or synchronization conservation state, the header cyclic redundancy checker 410" needs not detect whether each byte in a data cell is a header or not. The only operations required are the inspection after the last byte of each data cell (the pointer signal Ptr_Max) and the inspection of the foremost four bytes of each data cell (the pointer signal Ptr_L4).

In FIG. 4, the byte-wise data pipeline 408 receives the byte data within the data stream AtmRx_Data submitted by the deframer 306 (refer to FIG. 3). The data stream enable signal AtmRx_Hit is capable of enabling the byte-wise data pipeline 408. The byte-wise data pipeline 408 temporarily stores the byte data within the data stream AtmRx_Data according to the state signal from the cell delineation state machine 402 and the pointer signal from the byte pointer 404. The registered data stream AtmRx_Data data can be transmitted to the header cyclic redundancy checker 410 for compensatory modification in the decision for the reception of headers or to the header cyclic redundancy checker 410 for compensatory modification in the decision for the reception of headers. The data stream AtmRx_Data data may also send out two double words of data in parallel (that is, 64 bits of data) to the descrambler 412 so that the descrambler 412 can descramble a double word of data to the buffer 304.

Figure 9:
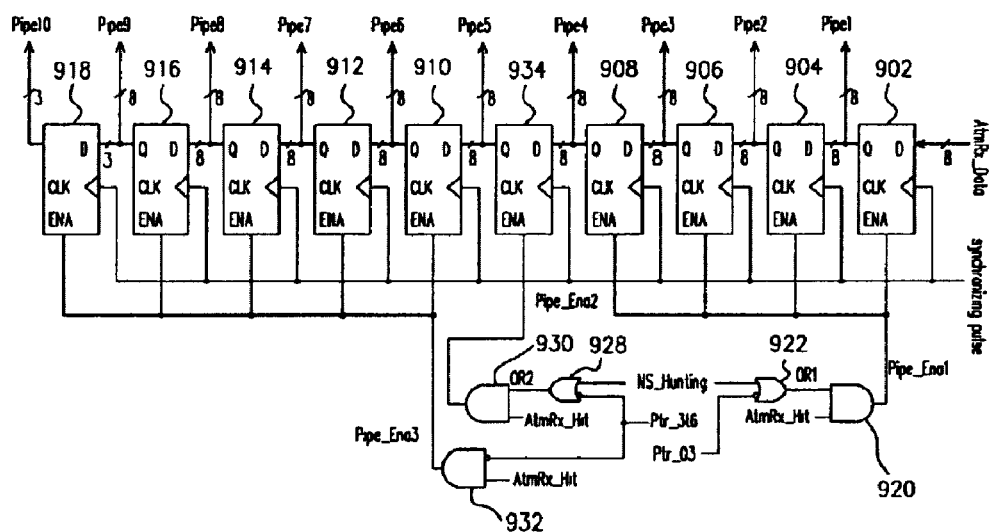
FIG. 9 is a diagram showing a circuit implementation of the byte-wise data pipeline according to one preferred embodiment of this invention.

FIG. 9 is a diagram showing a circuit implementation of the byte-wise data pipeline according to one preferred embodiment of this invention. As shown in FIG. 9, an input terminal of an OR gate 922 within the byte-wise data pipeline 408 receives the state signal NS_Hunting from the cell delineation state machine 402 (refer to FIG. 4). An inversion input terminal of the OR gate 922 receives the pointer signal Ptr_03 from the byte pointer 404. The output terminal of the OR gate 922 outputs an ORed signal OR1. A first input terminal of the AND gate 920 receives the ORed signal OR1 from the OR gate 922 and a second input terminal of the AND gate 920 receives the data stream enable signal AtmRx_Hit. The output terminal of the AND gate 920 outputs a first enable signal Pipe_Ena1 to the enable terminal ENA of a first D-type flip-flop 902, a second D-type flip-flop 904, a third D-type flip-flop 906 and a fourth D-type flip-flop 908.

The clock terminal CLK of the D-type flip-flop 902 receives a synchronizing pulse while the enable terminal ENA of the D-type flip-flop 902 receives the first enable signal Pipe-Ena1 so that the D-type flip-flop 902 is enabled. The input terminal D of the D-type flip-flop 902 receives the data stream AtmRx_Data data and the output terminal Q of the D-type flip-flop 902 outputs the data byte Pipe1.

The clock terminal CLK of the D-type flip-flop 904 receives a synchronizing pulse while the enable terminal ENA of the D-type flip-flop 902 receives the first enable signal Pipe-Ena1 so that the D-type flip-flop 904 is enabled. The input terminal D of the D-type flip-flop 904 receives the data byte Pipe1 and the output terminal Q of the D-type flip-flop 904 outputs the data byte Pipe2.

The clock terminal CLK of the D-type flip-flop 906 receives a synchronizing pulse while the enable terminal ENA of the D-type flip-flop 906 receives the first enable signal Pipe-Ena1 so that the D-type flip-flop 906 is enabled. The input terminal D of the D-type flip-flop 906 receives the data byte Pipe2 and the output terminal Q of the D-type flip-flop 906 outputs the data byte Pipe3.

The clock terminal CLK of the D-type flip-flop 908 receives a synchronizing pulse while the enable terminal ENA of the D-type flip-flop 908 receives the first enable signal Pipe-Ena1 so that the D-type flip-flop 908 is enabled. The input terminal D of the D-type flip-flop 908 receives the data byte Pipe3 and the output terminal Q of the D-type flip-flop 908 outputs the data byte Pipe4.

According to the pointer signal Ptr_03 and the state signal NS_Hunting, the data byte Pipe1, data byte Pipe2, data byte Pipe3 and data byte Pipe4 transmits serially from one D-type flip-flop to the next D-type flip-flop. However, the data bytes Pipe1, Pipe2, Pipe3 and Pipe4 may transmit in parallel a double word data (32 bits of data) to the descrambler 412. The pointer signal Ptr_03 controls the D-type flip-flop 902 such that the D-type flip-flop 902 is disabled after receiving the fourth byte H3. Hence, the fifth byte containing the header cyclic redundancy code HEC will not be received. The elimination of the header cyclic redundancy code prevents the incorporation of such code into the descrambler and the subsequent initiation of unnecessary descrambling.

An input terminal of an OR gate 928 receives the state signal NS_Hunting from the cell delineation state machine 402 and an inversion input terminal of the OR gate 928 receives the pointer signal Ptr_3t6 from the byte pointer 404. The output terminal of the OR gate 928 outputs an ORed signal OR2. A first input terminal of an AND gate 930 receives the ORed signal OR2 from the OR gate 928 and a second input terminal of the AND gate 930 receives the data stream enable signal AtmRx_Hit. The output terminal of the AND gate 930 outputs a second enable signal Pipe_Ena2 to a D-type flip-flop 934.

The clock terminal CLK of the D-type flip-flop 934 receives a synchronizing signal while the enable terminal ENA of the D-type flip-flop 934 receives the second enable signal Pipe_Ena2 from the AND gate 930. The input terminal D of the D-type flip-flop 934 receives the output from the D-type flip-flop 908. The output terminal Q of the D-type flip-flop 934 outputs not only to another flip-flop 910 but also to the header cyclic redundancy checker 410 via the pipeline Pipe5 so that payload data received by the byte-wise data pipeline 408 may be transmitted to the checker 410 for compensatory modification. Furthermore, through the disabling of the second enable signal Pipe_Ena2 (the pointer Ptr_3t6) during the acquisition of the fourth to the seventh bytes of a data cell from the byte-wise data pipeline 408, the header data H0~H3 acquired from the byte-wise pipeline 408 is shunt from the downstream flip-flops. Therefore, in subsequent descrambling, the descrambler 412 descrambles the payload data within the data cell. In addition, after receiving the eight bytes from the byte-wise data pipeline 408, the flip-flop 934 is disabled so that the payload portion of the data can be transferred to other flip-flops and then re-directed to the checker 410 for necessary compensation.

An inversion input terminal of an AND gate 932 within the byte-wise data pipeline 408 receives the pointer signal Ptr_3t6 from the byte pointer 404 and an input terminal of the AND gate 932 receives the data stream enable signal AtmRx_Hit. The output terminal of the AND gate 932 outputs a third enable signal Pipe_Ena3 to D-type flip-flops 910, 912, 914, 916 and 918 respectively.

The clock terminal CLK of the D-type flip-flop 910 receives a synchronizing signal while the enable terminal ENA of the D-type flip-flop 910 receives the third enable signal Pipe_Ena3 so that the D-type flip-flop 910 is enabled. The input terminal D of the D-type flip-flop 910 receives the output from the D-type flip-flop 934 and the output terminal Q of the D-type flip-flop 910 outputs a data byte Pipe6 and transmits the data byte Pipe6 to the D-type flip-flop 912 as well.

The clock terminal CLK of the D-type flip-flop 912 receives a synchronizing signal while the enable terminal ENA of the D-type flip-flop 912 receives the third enable signal Pipe_Ena3 so that the D-type flip-flop 912 is enabled. The input terminal D of the D-type flip-flop 912 receives the output from the D-type flip-flop 910 and the output terminal Q of the D-type flip-flop 912 outputs a data byte Pipe7 and transmits the data byte Pipe7 to the D-type flip-flop 914 as well.

The clock terminal CLK of the D-type flip-flop 914 receives a synchronizing signal while the enable terminal ENA of the D-type flip-flop 914 receives the third enable signal Pipe_Ena3 so that the D-type flip-flop 914 is enabled. The input terminal D of the D-type flip-flop 914 receives the output from the D-type flip-flop 912 and the output terminal Q of the D-type flip-flop 914 outputs a data byte Pipe8 and transmits the data byte Pipe8 to the D-type flip-flop 916 as well.

The clock terminal CLK of the D-type flip-flop 916 receives a synchronizing signal while the enable terminal ENA of the D-type flip-flop 916 receives the third enable signal Pipe_Ena3 so that the D-type flip-flop 916 is enabled. The input terminal D of the D-type flip-flop 916 receives the output from the D-type flip-flop 914 and the output terminal Q of the D-type flip-flop 916 outputs a data byte Pipe9 and transmits the data byte Pipe9 to the D-type flip-flop 918 as well.

The clock terminal CLK of the D-type flip-flop 918 receives a synchronizing signal while the enable terminal ENA of the D-type flip-flop 918 receives the third enable signal Pipe_Ena3 so that the D-type flip-flop 918 is enabled. The input terminal D of the D-type flip-flop 918 receives the zeroth to the second bit of data from the D-type flip-flop 916 and the output terminal Q of the D-type flip-flop 918 outputs a 3-bit data byte Pipe10.

The consecutively received data cells are computed to obtain syndrome codes. If a syndrome code is 0x00, the payload data (refer to FIG. 1) within the data cell must be descrambled. The third to the seventh bit of data byte Pipe6, the data type Pipe7, the data byte Pipe8, the data byte Pipe9 and the 3-bit data byte Pipe10 are sent to the descrambler 412 as reference data for descrambling the payload data.

According to the circuit diagram in FIG. 9, the byte-wise data pipeline 408 not only receives and stores byte data, but also enables each section separately so that the pipeline 408 also serves as a common data source for supplying information to various related components. In other words, the flip-flops 902, 904, 906 and 908 controlled by the first enable signal Pipe_Ena1 can be considered as a first section. Similarly, the flip-flop 934 controlled by the second enable signal Pipe_Ena2 can be considered as a second section and the flip-flops 910, 912, 914, 916 and 918 can be considered as a third section.

In a search state, the first, the second and the third section are all disabled when the header is not yet found. Once the header is found and the foremost four bytes are acquired, the first, the second and the third sections are disabled according to the signals Ptr03 and Ptr3t6 received from the byte pointer 404 so that the acquisition of the header cyclic redundancy code (HEC) is blocked. After the pulse for receiving the fifth byte of the data cell is through, the first section is re-enabled. The second and the third section continues to be disabled until the seventh bytes is incorporated into the byte-wise data pipeline 408 so that the header data H0~H3 are blocked. This prevents the transmission of such data to ensuing flip-flops but permits the sequential input of payload data into the byte-wise data pipeline 408. Eventually, all sections are re-enabled to permit the reception of all the data cells.

In FIG. 4, the descrambler 412 receives the 64-bit data (the data byte Pipe1, the data byte Pipe2, the data byte Pipe3, the data byte Pipe4, the third bit to the seventh bit of the data byte Pipe6, the data byte Pipe7, the data byte Pipe8, the data byte Pipe9 and the 3-bit data byte Pipe10) from the byte-wise data pipeline 408 to the pointer signals submitted from the byte pointer 404, the descrambler 412 conducts a XOR operation of the double word data (the data bytes Pipe1, Pipe2, Pipe3 and Pipe4) having a scrambling format to obtain a descrambled double word data RxBuf_WrData. The double word data RxBuf_WrData is submitted to the buffer 304 (refer to FIG. 3).

Figure 10:
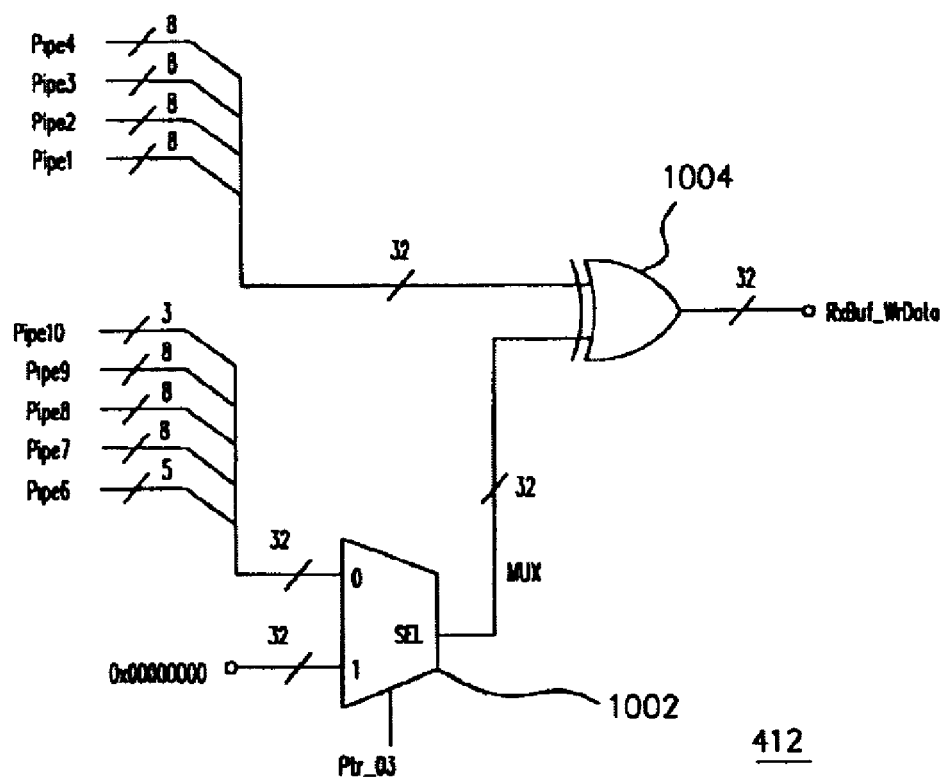
FIG. 10 is a diagram showing a circuit implementation of the descrambler according to one preferred embodiment of this invention.

FIG. 10 is a diagram showing a circuit implementation of the descrambler according to one preferred embodiment of this invention. As shown in FIG. 10, the multiple byte input terminal "0" of a multiplexer 1002 within the descrambler 412 receives the third bit to the seventh bit of the data byte Pipe6, the data byte Pipe7, the data byte Pipe8, the data byte Pipe9 and the 3-bit data byte Pipe10 sent from the byte-wise data pipeline 408 (refer to FIG. 4). The multiple byte input terminal "1" of the multiplexer 1002 receives the value 0x00000000. The select terminal SEL of the multiplexer 1002 receives the pointer signal Ptr_03 from the byte pointer 404 (refer to FIG. 4). The pointer signal Ptr_03 a controls the multiplexer 1002 so that the multiple byte output terminal of the multiplexer 1002 outputs a multiple byte data MUX that includes the third bit to the seventh bit of the data byte Pipe6, the data byte Pipe7, the data byte Pipe8, the data byte Pipe9 and the 3-bit data byte Pipe10 or the value 0x00000000.

A first multiple byte input terminal of a XOR gate 1004 receives the data byte Pipe1, the data byte Pipe2, the data byte Pipe3 and the data byte Pipe4. A second multiple byte input terminal of the XOR gate 1004 receives the multiple byte data MUX from the multiplexer 1002. The XOR gate 1004 conducts a XOR operation of the 32-bit data sent to the first and the second multiple byte input terminal of the XOR gate 1004 to produce a double word data RxBuf_WrData. The double word data RxBuf_WrData is transmitted to the buffer 304 (refer to FIG. 3).

Before a transmitting system transmits necessary data cells to a reception system, the transmitting system often transmits an idle data cell to the reception system for data transmission synchronization. In FIG. 4, as the idle cell identifier 414 receives the data stream enable signal Atm-Rx_Hit, the idle cell identifier 414 is enabled. Thereafter, the idle cell identifier 414 may transmit an idle data cell signal to the write-in buffer controller 416 to inform the write-in buffer controller 416 that the data cell is an idle cell.

Figure 11A:
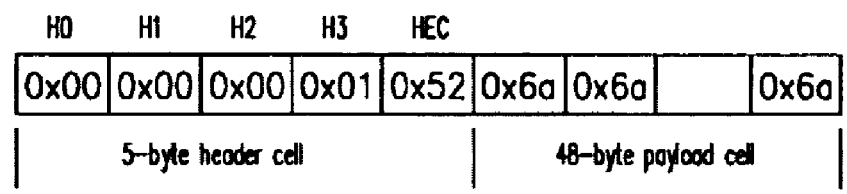
FIG. 11A is a diagram showing a data format of the idle cell according to this invention.

FIG. 11A is a diagram showing a data format of the idle cell according to this invention. Data format of the idle data cell includes header bytes H0~H2 each having a value 0x00, header byte H3 having a value 0x01 and the header cyclic redundancy code HEC byte having a value 0x52.

Figure 11B:
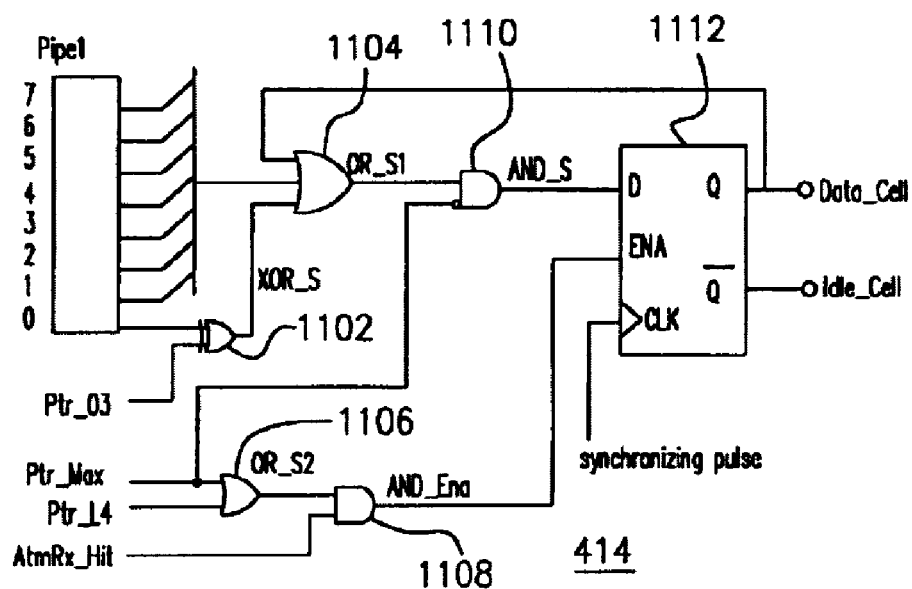
FIG. 11B is a diagram showing a circuit implementation of the idle cell identifier according to one preferred embodiment of this invention.

FIG. 11B is a diagram showing a circuit implementation of the idle cell identifier according to one preferred embodiment of this invention. As shown in FIG. 11B, a first input terminal of a XOR gate 1102 within the idle cell identifier 414 receives the zeroth bit of the data byte Pipe1 from the byte-wise data pipeline 408 (refer to FIG. 4). A second input terminal of the XOR gate 1102 receives the pointer signal Ptr_03 from the byte pointer 404. The output terminal of the XOR gate 1102 outputs a XORed signal XOR_S.

A first input terminal of an OR gate 1104 receives a non-idle data cell signal Data_Cell from a D-type flip-flop 1112. A second to an eighth input terminal of the OR gate 1104 receive the seventh bit to the first bit of the data byte Pipe1 from the byte-wise data pipeline 408 respectively. A ninth input terminal of the OR gate 1104 receives the XORed signal XOR_S. The output terminal of the OR gate 1104 outputs an ORed signal OR_S1.

A first input terminal of an OR gate 1106 receives a pointer signal Ptr_Max from the byte pointer 404 and a second input terminal of the OR gate 1106 receives a pointer signal Ptr_L4 from the byte pointer 404. The output terminal of the OR gate 1106 outputs an ORed signal OR_S2. An input terminal of an AND gate 1110 receives the ORed signal OR_S1 from the OR gate 1104 and an inversion input terminal of the AND gate 1110 receives the pointer signal Ptr_Max from the byte pointer 404. The output terminal of the AND gate 1110 outputs an ANDed signal AND_S.

A first input terminal of an AND gate 1108 receives the ORed signal OR_S2 from the OR gate 1106 and a second input terminal of the AND gate 1108 receives the data stream enable signal AtmRx_Hit. The output terminal of the AND gate 1108 outputs an ANDed enable signal AND_Ena.

The input terminal D of a D-type flip-flop 1112 receives the signal AND_S and the enable terminal ENA of the D-type flip-flop 1112 receives the enable signal AND_Ena from the AND gate 1108. While the clock terminal CLK of the D-type flip-flop 1112 receives a synchronizing pulse, the output terminal Q of the D-type flip-flop 1112 outputs the non-idle data cell signal Data_Cell and the inverted output terminal $\overline{Q}$ of the D-type flip-flop 1112 outputs an idle data cell signal Idle_Cell.

In FIG. 11B, as the idle cell identifier 414 circuit receives the non-idle data cell format, various non-idle cell signals Data_Cell produced by various gates within the idle cell identifier 414 are submitted to the write-in buffer controller 416 via the D-type flip-flops 1112.

In FIG. 4, the write-in buffer controller 416 receives the data stream enable signal AtmRx_Hit so that the write-in buffer controller 416 is enabled. According to the pointer signal from the byte pointer 404, the state signals from the cell delineation state machine 402, the write request signal RxBuf_WrReq from the buffer 304 (refer to FIG. 3) and the non-idle data cell signal Data_Cell from the idle cell identifier 414, the write-in buffer controller 416 decides if the data cell needs to be sent to the buffer 304 (refer to FIG. 3). If the data cell is not an idle cell, the write-in buffer controller 416 submits a write-in signal RxBuf_WrHit to the buffer 304 (refer to FIG. 3) and informs the buffer 304 to receive the double word data from the descrambler 412. However, if the buffer 304 is completely filled, a signal WrReq will be submitted by the buffer 304 to inform the write-in buffer controller 416. When the descrambler 412 needs to submit double word data to the buffer 304, the write-in buffer controller 416 will issue an overflow signal RxBuf_Ovf to an upper layer system.

Figure 12:
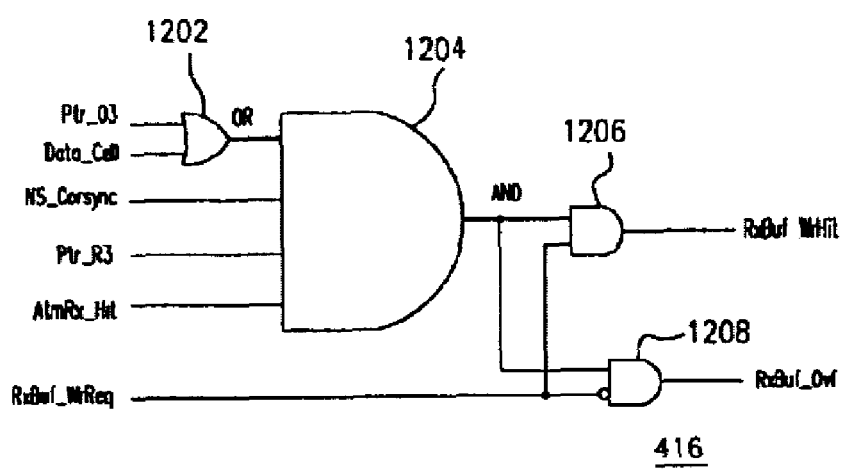
FIG. 12 is a diagram showing a circuit implementation of the write-in buffer controller according to one preferred embodiment of this invention.

FIG. 12 is a diagram showing a circuit implementation of the write-in buffer controller according to one preferred embodiment of this invention. As shown in FIG. 12, a first input terminal of an OR gate 1202 within the write-in buffer controller 416 receives the pointer signal Ptr_03 from the byte pointer 404 (refer to FIG. 4). A second input terminal of the OR gate 1202 receives the non-idle data cell signal Data_Cell from the idle cell identifier 414. The output terminal of the OR gate 1202 outputs an ORed signal OR.

A first input terminal of an AND gate 1204 receives the ORed signal OR from the Or gate 1202. A second input terminal of the AND gate 1204 receives the state signal NS_Corsync from the cell delineation state machine 402. A third input terminal of the AND gate 1204 receives the pointer signal Ptr_R3 from the byte pointer 404. A fourth input terminal of the AND gate 1204 receives the data stream enable signal AtmRx_Hit. The output terminal of the AND gate 1204 outputs an ANDed signal AND.

A first input terminal of an AND gate 1206 receives the ANDed signal AND from the AND gate 1204 and a second input terminal of the AND gate 1206 receives the write-in request signal RxBuf_WrReq from the buffer (refer to FIG. 3). The output terminal of the AND gate 1206 outputs a write-in signal RxBuf_WrHit to the buffer 304 (refer to FIG. 3).

An input terminal of an AND gate 1208 receives the ANDed signal AND from the AND gate 1204 and an inversion input terminal of the AND gate 1208 receives the write-in request signal RxBuf_WrReq from the buffer 304 (refer to FIG. 3). The output terminal of the AND gate 1208 outputs an overflow signal RxBuf_Ovf to an upper layer system.

In FIG. 12, as the write-in buffer 304 (refer to FIG. 3) is completely filled, the write-in request signal RxBuf_WrReq from the buffer 304 has a value "0". If the descrambler 412 (refer to FIG. 4) needs to write double word data into the buffer 304, the write-in buffer controller 416 will issue an overflow signal RxBuf_Ovf having a value "1" to upper layer system and inform the upper layer buffer 304 about the condition.

Figure 13:
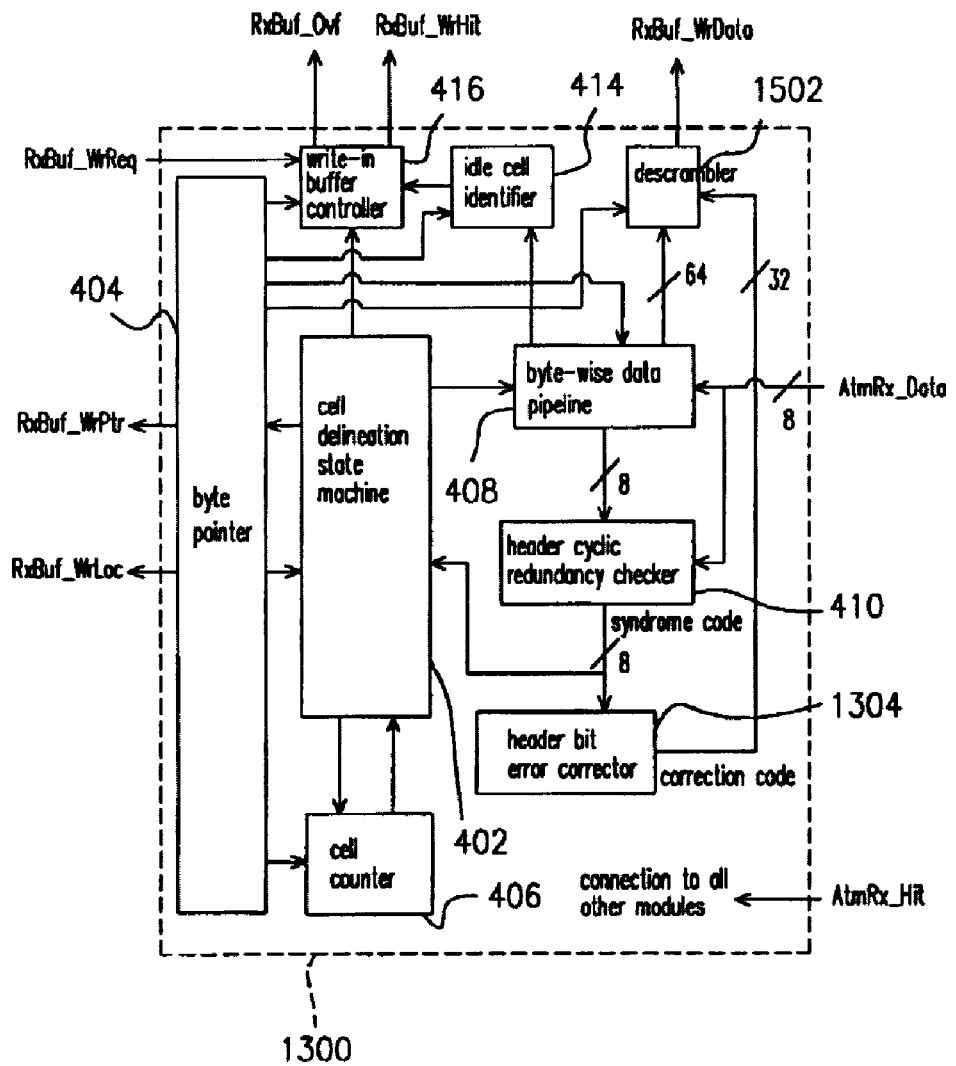
FIG. 13 is a block diagram showing a transmission convergence sublayer system for receiving asynchronous transfer according to a second embodiment of this invention.

FIG. 13 is a block diagram showing a transmission convergence sublayer system for receiving asynchronous transfer according to a second embodiment of this invention. As shown in FIG. 13, the asynchronous transfer mode transmission convergence sublayer circuit 1300 at the reception end of a transmission system is similar to the one shown in FIG. 4. One major difference for the circuit in FIG. 13 is the addition of a header bit error corrector 1304. Furthermore, the header bit error corrector 1304 has terminals for sending signals to a descrambler 1502.

The header cyclic redundancy checker 410 computes to find syndrome code from the header cells (refer to FIG. 1). If a one-bit data error is found, the header cyclic redundancy checker 410 submits a syndrome code for the occurrence of one-bit data error to the header bit error corrector 1304. FIG. 14 is a lookup reference table for modifying bit errors. The header bit error corrector 1304 has a header bit error correction function. For example, when the zeroth bit of the header cell in error, the 8-bit syndrome code sent by the header cyclic redundancy checker 410 is 0x07. The header bit error corrector 1304 obtains a 32-bit correction code 0x0000001 from the header bit error table in FIG. 14. The 32-bit correction code is transmitted to the descrambler 1502. If the received header cell is correct or contains two or more bit errors, the syndrome code computed by the header cyclic redundancy checker 410 sets the header bit error checker 1304 to default and the header bit error corrector 1304 submits a correction code 0x00000000 to the descrambler 1502. In other words, no modification is carried out.

Figure 15:
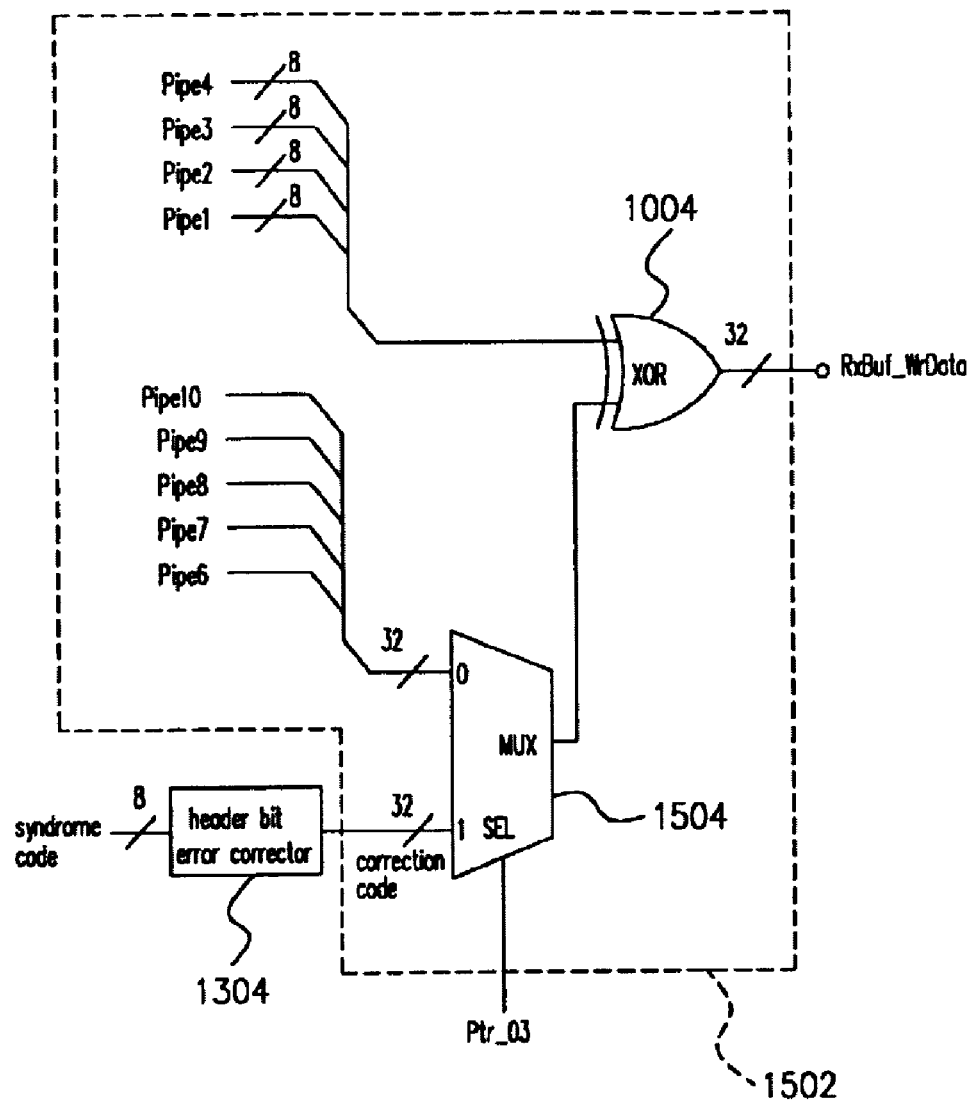
FIG. 15 is a diagram showing a circuit implementation of the descrambler for connecting with the header bit error corrector according to one preferred embodiment of this invention.

FIG. 15 is a diagram showing a circuit implementation of the descrambler for connecting with the header bit error corrector according to one preferred embodiment of this invention. In FIG. 15, the data received via a multiplexer 1504 within the descrambler 1502 must be corrected. A first multiple byte input terminal of the multiplexer 1504 receives the third bit to the seventh bit of the data byte Pipe6, the data byte Pipe7, the data byte Pipe8, the data byte Pipe9 and the 3-bit data byte Pipe10. A second multiple byte input terminal of the multiplexer 1504 receives the 32-bit correction code from the header bit error corrector 1304. The select SEL terminal of the multiplexer 1504 receives the pointer signal Ptr_03 from the byte pointer 404 (refer to FIG. 13). The pointer signal Ptr_03 controls the multiple byte output terminal of the multiplexer 1504 and selects receives the third bit to the seventh bit of the data byte Pipe6, the data byte Pipe7, the data byte Pipe8, the data byte Pipe9 and the 3-bit data byte Pipe10 or the 32-bit correction code as output. Thus, when the header in the data cell has a one-bit data error, the header bit error corrector 1304 can correct the error.

In conclusion, one major aspect of this invention is the provision of an optimized asynchronous transfer mode transmission convergence sublayer circuit to synchronize data reception, inspect header cell, descramble and conduct data format rearrangement within a shorter processing interval.

A second aspect of this invention is the ease of introducing a simple correction circuit to correct one-bit error in data cells during transmission. Thus, the circuit has error-correction capacity without adding too much complexity and cost to the fabrication of the circuit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A transmission convergence sublayer circuit of an asynchronous transfer receiver for receiving data cells submitted from a deframer after receiving a data stream enable signal from the deframer, wherein the data cell comprises a plurality of bytes divided into a header and a payload, the transmission convergence sublayer circuit comprising:

a byte-wise data pipeline for receiving and temporarily holding the data bytes in the data cell;

a header cyclic redundancy checker for receiving the data bytes and transmitting a syndrome code capable of indicating the presence a header cell;

an idle cell identifier for deciding whether the data cell received by the byte-wise data pipeline is a non-idle data cell or not;

a cell delineation state machine for determining a transmission state of the data cell according to a content and frequency of the syndrome code and transmitting state signals reflecting a current state, wherein possible states at least include a search state and a complete synchronization state;

a byte pointer for issuing a pointer signal, wherein the pointer signal indicates a sequence number of the byte belonging to the data cell received by the byte-wise data pipeline and serves as an address pointer for sending double word data converted from newly received bytes into a buffer;

a descrambler for descrambling a plurality of bytes residing temporarily in the byte-wise data pipeline and sending resulting descrambled data to the buffer; and a write-in buffer controller for writing the descrambled data into the buffer according to the indication provided by the byte pointer when permission to do so is granted by the idle cell identifier and the cell delineation state machine, wherein the transmission convergence circuit further includes a cell counter for responding to conditions reguiring the cell delineation state machine to change from a search state into a complete synchronization state and vice versa according to the pointer signal submitted by the byte pointer, and the cell counter acts by first counting number of received data cells after the state transition and deciding if going into the complete synchronization state or returning to the search state is necessary.

2. The circuit of claim 1, wherein the header cyclic redundancy checker sequentially inspects all the received bytes, and the checker further includes a compensation circuit having a compensation source whose data is derived from registered payload data within the byte-wise data pipeline.

3. The circuit of claim 2, wherein the header cyclic redundancy checker further includes an energy-saving device for conducting header inspection for a last byte of each data cell and specified number of foremost bytes received by the transmission convergence sublayer only.

4. The circuit of claim 1, wherein the header cyclic redundancy checker generates the syndrome code by dividing the newest five bytes of data received in parallel from the byte-wise data pipeline by a polynomial $(X^8+X^2+X+1)$.

5. The circuit of claim 1, wherein the cell delineation state machine also outputs a secondary state signal that represents a next state, the byte pointer within the cell delineation state machine further includes a decoder and the decoder outputs a fourth byte signal indicating acquisition of a fourth byte into the byte-wise data pipeline according to the pointer signal from the byte pointer, the byte pointer uses the fourth byte signal and the secondary state signal to equalize the pointer signal corresponding to the sixth byte in the data cell and the pointer signal corresponding to the fifth byte in the data cell.

6. The circuit of claim 1, wherein the byte-wise data pipeline can be divided into serially connected first, second and third register sections, wherein the first section is temporarily disabled on receiving a header from the byte-wise data pipeline for preventing the byte-wise data pipeline from taking in the header cyclic redundancy code, the second section is temporarily disabled for a period of time after the header cyclic redundancy code is blocked and intake of payload data by the byte-wise data pipeline is continued so that transfer of header cell data into the third section and hence nullification of the payload data is prevented.

7. The circuit of claim 1, wherein the descrambler retrieves parallel byte data from the byte-wise data pipeline for descrambling double word data, and while descrambling header cell data, machine-generated values are used as descrambling parameters, and while descrambling payload cell data, previously received but still existing data in the byte-wise data pipeline are used as the descrambling parameters.

8. The circuit of claim 1, wherein the transmission convergence sublayer further includes a header bit error corrector such that if a single bit error occurs in the header data, a correction code corresponding to the syndrome code of the error header is looked up from a header bit error correction table and sent to the descrambler so that the descrambler can descramble out a correct header.

9. The circuit of claim 8, wherein the header bit error corrector submits a machine-generated non-correction code to the descrambler if the header cell has no bit error or contains two or more bit errors.

10. The circuit of claim 1, wherein the cell delineation state machine receives the data stream enable signal, the count signal from the cell counter, the syndrome code and one of the pointer signals of the byte pointer such that the data stream enable signal enables the cell delineation state machine, the cell delineation state machine determines if a current state needs to be changed according to the count signal, the syndrome code and the pointer signal and sends out a plurality of state signals corresponding to a resolved state;

the cell counter receives the data stream enable signal, one of the pointer signals of the byte pointer and the state signal corresponding to the state inside the cell delineation state machine, the data stream enable signal enables the byte pointer and accumulates a counter according to the state signal, and submits the count signal to the cell delineation state machine when the counter reaches a set value;

the byte pointer receives the enabling data stream signal and carries out a computation to find a count value to serve as an address for the current data byte of the data cell, a highest few bits of data in the count value are transferred to the buffer to serve as an address pointer and the data is encoded into pointer signals;

the byte-wise data pipeline receives the data stream enable signal, the state signal, the pointer signal and the data cell, the data stream enable signal enables the byte-wise data pipeline, the byte-wise data pipeline receives and temporarily holds the data cell in a pipeline according to the state signal and the pointer signal, the temporarily held data cell is transferred to the header cyclic redundancy checker, or alternatively, the data bytes in the data cell are converted to multiple byte data;

the descrambler receives the multiple byte data and conducts a XOR operation of the multiple byte data having a scrambled format according to one of the pointer signals to produce the word data;

the idle cell identifier receives the data cell, the data stream enable signal and the pointer signal, the data stream enable signal enables the idle cell identifier to determine if the data cell is a non-idle data cell according to the pointer signal and produces a non-idle data cell signal according to the result of determination; and the write-in buffer controller receives the data stream enable signal, the pointer signal, the non-idle data cell signal, one of the state signal and a write request signal from the buffer, the data stream enable signal enables the write-in buffer controller to determine if the multiple byte needs to be written into the buffer according to the pointer signal, the selected state signal and the non-idle data cell signal, a write-in signal is transmitted to the buffer according to the result of determination, however, if the buffer is completely filled, the buffer submits a negative write-in request signal to the write-in buffer controller so that the write-in buffer controller issues an overflow signal.

11. The circuit of claim 1, wherein the states determined by the cell delineation state machine include:

a header search state, an initially set state;

a pre-synchronization state, wherein entrance into the pre-synchronization state occurs when the newly received syndrome code is a specified code;

a full synchronization state, wherein entrance into the full synchronization state occurs when a cumulative total of the newly received syndrome code having the specified code reaches a first specified value; and a synchronization conservation state, wherein entrance into the synchronization conservation state from the full synchronization state occurs when the newly received syndrome code is not the specified code, and entrance from the synchronization conservation state to the header search state occurs when the cumulative total of the non-specified code reaches a second specified value, however, if the cumulative total of the non-specified code is less than the second specified value and the syndrome code is the specified code, the synchronization conservation state returns back to the full synchronization state.

12. The circuit of claim 11, wherein the cell delineation state machine further includes:

a secondary state estimator for providing a secondary state code according to a current state code, the count signals, the syndrome code and one of the pointer signals under various states;

a D-type flip-flop enabled by the data stream enable signal so that the secondary state code is output as a current state code within a synchronizing pulse cycle; and a decoder for decoding the current state code and the secondary state code into a plurality of current state signals and a plurality of secondary state signals.

13. The circuit of claim 11, wherein the cell counter comprises:

an AND gate having first input terminal, a second input terminal and an output terminal, wherein the first input terminal receives one of the pointer signals, the second input terminal receives the data stream enable signal and the output terminal outputs an ANDed signal;

a NOR gate having a first input terminal, a second input terminal and an output terminal, wherein the first input terminal receives a current search state signal from the cell delineation state machine, the second input terminal receives a current full synchronization state signal and the output terminal a NORed signal;

a counter having an enable terminal, a clear terminal, a clocking terminal and an output terminal, wherein the enable terminal receives the ANDed signal, the clear terminal receives the NORed signal, the clocking signal receives the synchronizing pulse and the output terminal outputs a count value;

a multiplexer having a first input terminal, a second input terminal, a selection terminal and an output terminal, wherein the first input terminal receives a first preset value, the second input terminal receives a second preset value, the selection terminal receives a pre-synchronization state signal from the cell delineation state machine and the output terminal outputs a selected preset value; and a comparator having a first input terminal, a second input terminal and an output terminal, wherein the first input terminal receives the count value, the second input terminal receives the selected preset value such that the output terminal outputs the count signal when the count value and the selected preset value are identical.

14. The circuit of claim 11, wherein the byte pointer further comprises:
- a first OR gate having a first input terminal, an inversion input terminal and an output terminal, wherein the input terminal receives a secondary header search state signal from the cell delineation state machine, the inversion input terminal receives one of the pointer signals and the output terminal outputs a first ORed signal;
- a D-type flip-flop having an input terminal, an enable terminal, a clocking terminal and an output terminal, wherein the input terminal receives the first ORed signal, the enable terminal receives the data stream enable signal, the clocking terminal receives a synchronizing pulse and the output terminal outputs a mask signal;
- a multiplexer having a first input terminal, a second input terminal, a selection terminal and an output terminal, wherein the first input terminal receives a first value, the second input terminal receives a second value, the selection terminal receives the secondary header search state signal to determine if the first value or the second value is the multiplex signal, and the output terminal output the multiplex signal;
- a second OR gate having a first input terminal, a second input terminal and an output terminal, wherein the first input terminal receives the secondary header search state signal, the second input terminal receives one of the pointer signal and the output terminal outputs a second ORed signal;
- an AND gate having a first input terminal, a second input terminal and an output terminal, wherein the first input terminal receives the data cell enable signal, the second input terminal receives the mask signal and the output terminal outputs an ANDed signal;
- a counter having an input terminal, a loading terminal, an enable terminal, a clocking terminal and an output terminal, wherein the input terminal receives the multiplex signal, the loading terminal receives the second ORed signal, the enable signal receives the ANDed signal, the clocking terminal receives the synchronizing pulse, the output terminal outputs in such a way that the output terminal outputs a value with one added when the ANDed signal is '1' and the second ORed signal is '0' and the output terminal outputs the multiplex signal when the ANDed signal is '1' and the second ORed signal is '1'; and
- a decoder for receiving the count value and decoding the count value into the various pointer signals.

15. The circuit of claim 1, wherein the header cyclic redundancy checker further comprises:
- a remainder compensation unit for receiving the bytes from the byte-wise data pipeline and conducting a XOR operation on the data bytes to produce remainder compensation data;
- a first modulo 2 adder for conducting a modulo 2 arithmetic between the data bytes inside the data cell and the remainder compensation data to generate a first add data;
- a second module 2 adder for conducting a modulo 2 arithmetic between the first add data and a quotient feedback data to generate a second add data;
- a D-type flip-flop having an input terminal, an output terminal, an enable terminal and a clocking terminal, wherein the clocking terminal receives the synchronizing pulse, the enable signal receives the data stream enable signal so that the D-type flip-flop is enabled, the input terminal receives the second add data and the output terminal outputs a flip-flop data;
- a quotient feedback unit for conducting a XOR operation of the flip-flop data from the D-type flip-flop to generate the quotient feedback data; and
- a plurality of inverters for inverting some of the bits among the flip-flop data submitted from the D-type flip-flop such that the inverted bits and the non-inverted bits of the flip-flop data join together to form the syndrome code.

16. The circuit of claim 1, wherein the byte-wise data pipeline further comprising:
- a first OR gate having an input terminal, an inversion input terminal and an output terminal, wherein the input terminal receives one of the state signals, the inversion input terminal receives one of the pointer signals, the output terminal outputs a first ORed signal;
- a first AND gate having a first input terminal, a second input terminal and an output terminal, wherein the first input terminal receives the first ORed signal, the second input terminal receives the data stream enable signal and the output terminal outputs a first ANDed signal;
- a first D-type flip-flop having a byte input terminal, a clocking terminal, an enable terminal and a byte output terminal, wherein the byte input terminal receives the data bytes of the data cell, the clocking terminal receives the synchronizing pulse, the enable terminal receives the first ANDed signal so that the first D-type flip-flop is enabled, and the byte output terminal outputs a first delay byte data;
- a second D-type flip-flop having a byte input terminal, a clocking terminal, an enable terminal and a byte output terminal, wherein the byte input terminal receives the first delay byte data, the clocking terminal receives the synchronizing pulse, the enable terminal receives the first ANDed signal so that the second D-type flip-flop is enabled, and the byte output terminal outputs a second delay byte data;
- a third D-type flip-flop having a byte input terminal, a clocking terminal, an enable terminal and a byte output terminal, wherein the byte input terminal receives the second delay byte data, the clocking terminal receives the synchronizing pulse, the enable terminal receives the first ANDed signal so that the third D-type flip-flop is enabled, and the byte output terminal outputs a third delay byte data;
- a fourth D-type flip-flop having a byte input terminal, a clocking terminal, an enable terminal and a byte output terminal, wherein the byte input terminal receives the third delay byte data, the clocking terminal receives the synchronizing pulse, the enable terminal receives the first ANDed signal so that the fourth D-type flip-flop is enabled, and the byte output terminal outputs a fourth delay byte data;
- a second OR gate having an input terminal, an inversion input terminal and an output terminal, wherein the input terminal receives one of the state signals, the inversion input terminal receives one of the pointer signals and the output terminal outputs a second ORed signal;
- a second AND gate having a first input terminal, a second input terminal and an output terminal, wherein the first input terminal receives the second ORed signal, the second input terminal receives the data stream enable signal and the output terminal outputs a second ANDed signal;

a fifth D-type flip-flop having a byte input terminal, a clocking terminal, an enable terminal and a byte output terminal, wherein the byte input terminal receives the fourth delay byte data, the clocking terminal receives the synchronizing pulse, the enable terminal receives the second ANDed signal so that the fifth D-type flip-flop is enabled, and the byte output terminal outputs a fifth delay byte data;

a third AND gate having a first input terminal, a second input terminal and an output terminal, wherein the first input terminal receives one of the pointer signals, the second input terminal receives the data stream enable signal and the output terminal outputs a third ANDed signal;

a sixth D-type flip-flop having a byte input terminal, a clocking terminal, an enable terminal and a byte output terminal, wherein the byte input terminal receives the fifth delay byte data, the clocking terminal receives the synchronizing pulse, the enable terminal receives the third ANDed signal so that the sixth D-type flip-flop is enabled, and the byte output terminal outputs a sixth delay byte data;

a seventh D-type flip-flop having a byte input terminal, a clocking terminal, an enable terminal and a byte output terminal, wherein the byte input terminal receives the sixth delay byte data, the clocking terminal receives the synchronizing pulse, the enable terminal receives the third ANDed signal so that the seventh D-type flip-flop is enabled, and the byte output terminal outputs a seventh delay byte data;

a eighth D-type flip-flop having a byte input terminal, a clocking terminal, an enable terminal and a byte output terminal, wherein the byte input terminal receives the seventh delay byte data, the clocking terminal receives the synchronizing pulse, the enable terminal receives the third ANDed signal so that the eighth D-type flip-flop is enabled, and the byte output terminal outputs an eighth delay byte data;

a ninth D-type flip-flop having a byte input terminal, a clocking terminal, an enable terminal and a byte output terminal, wherein the byte input terminal receives the eighth delay byte data, the clocking terminal receives the synchronizing pulse, the enable terminal receives the third ANDed signal so that the ninth D-type flip-flop is enabled, and the byte output terminal outputs a ninth delay byte data; and a tenth D-type flip-flop having a byte input terminal, a clocking terminal, an enable terminal and a byte output terminal, wherein the byte input terminal receives the ninth delay byte data, the clocking terminal receives the synchronizing pulse, the enable terminal receives the third ANDed signal so that the tenth D-type flip-flop is enabled, and the byte output terminal outputs a tenth delay byte data.

17. The circuit of claim 16, wherein the descrambler further comprises:

a multiplexer having a first multiple byte input terminal, a second multiple byte input terminal, a selection terminal and a multiple byte output terminal, wherein the first multiple byte input terminal receives the highest five bits of the sixth delay byte data, the seventh delay byte data, the eighth delay byte data, the ninth delay byte data and the tenth delay byte data, the second multiple byte input terminal receives a 32-bit '0' data, the selection terminal receives one of the pointer signals and the multiple byte output terminal outputs a multiplexed multiple byte data; and a XOR gate having a first multiple byte input terminal, a second multiple byte input terminal and a multiple byte output terminal, wherein the first multiple byte input terminal receives the first delay byte data, the second delay byte data, the third delay byte data and the fourth delay byte data, the second multiple input terminal receives the multiplexed multiple byte data and the output terminal outputs the word data.

18. The circuit of claim 16, wherein the idle cell identifier further comprising:

a XOR gate having a first input terminal, a second input terminal and an output terminal, wherein the first input terminal receives the zeroth bit of the first delay byte data, the second input terminal receives one of the pointers and the output terminal outputs a XORed signal;

a third OR gate having a plurality of input terminals and an output terminal, wherein the input terminal receives a non-idle data cell signal, the first to the seventh bit of the first delay byte data and the XORed signal, and the output terminal outputs a third ORed signal;

a fourth OR gate having a first input terminal, a second input terminal and an output terminal, wherein the first input terminal receives one of the pointer signals, the second input terminal receives another one of the pointer signals, and the output terminal outputs a fourth ORed signal;

a fourth AND gate having an input terminal, an inversion input terminal and an output terminal, wherein the input terminal receives the third ORed signal, the inversion input terminal receives one of the pointer signals, and the output terminal outputs a fourth ANDed signal;

a fifth AND gate having a first input terminal, a second input terminal and an output terminal, wherein the first input terminal receives the fourth ORed signal, the second input terminal receives the data cell enable signal, and the output terminal outputs a fifth ANDed signal; and a D-type flip-flop having an input terminal, an enable terminal, a clocking terminal, an output terminal and an inversion output terminal, wherein the input terminal receives the fourth ANDed signal, the enable terminal receives the fifth ANDed signal so that the D-type flip-flop is enabled, the clocking terminal receives the synchronizing pulse, the output terminal outputs the non-idle data cell signal and the inverted output terminal outputs the idle data cell signal.

19. The circuit of claim 1, wherein the write-in buffer controller further comprises:

an OR gate having a first input terminal, a second input terminal and an output terminal, wherein the first input terminal receives one of the pointer signals, the second input terminal receives the non-idle data cell signal and the output terminal outputs an ORed signal;

a first AND gate having a first input terminal, a second input terminal, a third input terminal, a fourth input terminal and an output terminal, wherein the first input terminal receives the ORed signal, the second input terminal receives one of the state signals, the third input terminal receives another one of the pointer signals, the fourth input terminal receives the data stream enable signal and the output terminal outputs a first ANDed signal;

a second AND gate having a first input terminal, a second input terminal and an output terminal, wherein the first input terminal receives the first ANDed signal, the second input terminal receives a write-in request signal from the buffer and the output terminal outputs the write-in signal; and a third AND gate having an input terminal, an inversion input terminal and an output terminal, wherein the input terminal receives the first ANDed signal, the inversion input terminal receives the write-in request signal and the output terminal outputs the overflow signal.

20. A method of operating the transmission convergence sublayer of an asynchronous transfer receiver capable of receiving a data cell and a data stream enable signal from a deframer, wherein the data cell can be divided into header bytes and payload bytes, the operating method comprising the steps of:

a byte-wise data pipeline receiving a plurality of data bytes, wherein the byte-wise data pipeline not only receives but also temporarily holds a specific number of bytes in sequence;

a header cyclic redundancy checker synchronously receiving the plurality of data bytes and determining if a header is received, wherein a syndrome code representing the presence or absence of a header is issued;

a cell delineation state machine determining if a state transition from a search state to a full synchronization state is carried out according to the syndrome code;

a descrambler acquiring data bytes capable of descrambling out a double word into the byte-wise data pipeline in parallel after stepping into the full synchronization state in preparation for descrambling; and a byte pointer outputting a pointer signal according to the state indicated by the cell delineation state machine for pointing out the sequence number of the newly received bytes belonging to the data cell as well as the storage address of the descrambled data, wherein the method further includes a header data correction step for submittina a correction code to the descrambler when the header contains a bit error and the correction code is obtained from a correction table according to the syndrome code of the header.

21. The method of claim 20, wherein the byte-wise data pipeline receives data according to the following steps:

a data cell reception step for receiving any data bytes within the data cell;

a header cyclic redundancy code elimination step for disabling a first portion of the byte-wise data pipeline holding principle header data and preventing any header cyclic redundancy code from passing into the byte-wise data pipeline; and a header cell elimination step for disabling a second portion of the byte-wise, data pipeline for a period after the passage of header cyclic redundancy code into the byte-wise data pipeline is blocked but the passage payload cell data into the byte-wise data pipeline is continued so that header cell data shifting into the remaining area of the byte-wise data pipeline is avoided.

22. The method of claim 20, wherein the method further includes a first data cell counting step for counting the number of data cell received since the last state transition according to the pointer signal provided by the byte pointer and assessing the need for a transition into the full synchronization state before the cell delineation state machine actually transits from the search state into the full synchronization state.

23. The method of claim 20, wherein the method further includes a second data cell counting step for counting the number of data cell received since the last state transition according to the pointer signal provided by the byte pointer and assessing the need for a transition back to the search state before the cell delineation state machine actually transits from the full synchronization state into the search state.

24. The method of claim 20, wherein the pointer signal outputting step further includes the utilization of a pointer signal from the byte pointer and a secondary state signal from the synchronization state machine for equalizing the pointer signal corresponding to the first byte data of the payload cell and the pointer signal corresponding to the header cyclic redundancy code.

25. The method of claim 20, wherein the method further includes a buffer address setting step for retrieving a specified number of the highest effective bits to serve as a buffer input address.

* * * * *